(12) United States Patent
McMorrow et al.

(10) Patent No.: US 10,855,383 B2
(45) Date of Patent: Dec. 1, 2020

(54) CALIBRATION OF ACTIVE ELECTRONICALLY STEERED ANTENNAS USING TRIM BITS AND NON-VOLATILE MEMORY

(71) Applicant: ANOKIWAVE, INC., San Diego, CA (US)

(72) Inventors: Robert McMorrow, Concord, MA (US); Vipul Jain, San Diego, CA (US); Mikhail Shirokov, Burlington, MA (US); Kevin B. Greene, Cambridge, MA (US); Susanne A. Paul, Austin, TX (US); Shamsun Nahar, San Diego, CA (US)

(73) Assignee: ANOKIWAVE, INC., San Diego, CA (US)

( * ) Notice: Subject to any disclaimer, the term of this patent is extended or adjusted under 35 U.S.C. 154(b) by 0 days.

(21) Appl. No.: 16/353,893

(22) Filed: Mar. 14, 2019

(65) Prior Publication Data
US 2020/0295853 A1    Sep. 17, 2020

(51) Int. Cl.
*H04B 17/13* (2015.01)
*H04B 7/06* (2006.01)
*H04B 17/10* (2015.01)
*H04B 17/00* (2015.01)
*H04B 17/12* (2015.01)

(52) U.S. Cl.
CPC ......... *H04B 17/13* (2015.01); *H04B 17/0085* (2013.01); *H04B 17/102* (2015.01); *H04B 17/12* (2015.01)

(58) Field of Classification Search
CPC ... G11C 29/028; G11C 11/4074; H04B 17/13; H04B 17/12; H04B 7/0617
See application file for complete search history.

(56) References Cited

U.S. PATENT DOCUMENTS

| 6,194,962 | B1 * | 2/2001 | Chen | H03F 3/4521 |
| | | | | 330/253 |
| 7,826,417 | B2 | 11/2010 | Yang | |
| 9,214,950 | B1 * | 12/2015 | Davis | H03M 1/089 |
| 9,520,836 | B1 * | 12/2016 | Kaper | H03F 1/086 |

(Continued)

OTHER PUBLICATIONS

Don Fussell, Chapter 2, "Bits, Data Types and Operations", University of Texas at Austin CS310H—Computer Organization, (Year: 2010).*

*Primary Examiner* — Aristocratis Fotakis
(74) *Attorney, Agent, or Firm* — Mintz Levin Cohn Ferris Glovsky and Popeo, P.C.

(57) ABSTRACT

A system and a method for calibrating an antenna using trim bits and non-volatile memory is disclosed. In one aspect, an apparatus includes a power amplifier configured to at least amplify the output signal of the first antenna. The power amplifier includes multiple stages. The apparatus further includes a trim control circuit configured to adjust a bias of one of the stages of the power amplifier, using trim bits from non-volatile memory. The trim control circuit is further configured to scale the bias of one of the plurality of stages of the power amplifier by an integer between 0 and $2^n-1$ corresponding to a binary number formed by the first plurality of trim bits, wherein n corresponds to the number of trim bits.

22 Claims, 19 Drawing Sheets

(56) References Cited

U.S. PATENT DOCUMENTS

| | | | |
|---|---|---|---|
| 9,876,514 B1* | 1/2018 | Corman | H04B 1/04 |
| 10,033,331 B1* | 7/2018 | Ivanov | H03F 1/0205 |
| 2003/0128594 A1* | 7/2003 | Tran | G11C 29/028 |
| | | | 365/189.09 |
| 2005/0132241 A1 | 6/2005 | Curt | |
| 2006/0256880 A1* | 11/2006 | Frisch | G01R 31/31706 |
| | | | 375/257 |
| 2009/0279594 A1* | 11/2009 | Muhammad | G06F 9/4812 |
| | | | 375/219 |
| 2009/0298440 A1* | 12/2009 | Takeya | H01Q 1/243 |
| | | | 455/67.14 |
| 2010/0156536 A1* | 6/2010 | Lee | H03F 1/0261 |
| | | | 330/261 |
| 2017/0070199 A1* | 3/2017 | Anderson | B82Y 10/00 |
| 2019/0074806 A1* | 3/2019 | Scott | H04L 1/24 |
| 2019/0206467 A1* | 7/2019 | Karmakar | G11C 29/028 |

\* cited by examiner

CALIBRATION OF ACTIVE ELECTRONICALLY STEERED ANTENNAS USING TRIM BITS AND NON-VOLATILE MEMORY

TECHNICAL FIELD

The subject matter described herein relates generally to the calibration of integrated circuits using trim bits and non-volatile memory.

BACKGROUND

An active electronically steered antenna array may be used to generate direction-controlled beams, which may be useful in radar systems and/or other radio-based systems. Calibration of the beamforming antennas may involve additional hardware and/or processing during operation. In some aspects, the calibration can involve periodic and/or continual monitoring, measuring, processing, and application of modifications to signals for each antenna in the array. This calibration may impact the processing resources of the array available for operation.

SUMMARY

Systems, methods, and articles of manufacture, including computer program products, are provided for calibration of integrated circuits using trim bits and non-volatile memory. In one aspect, there is a method that includes amplifying, by a power amplifier, an output signal of a first antenna. The power amplifier includes multiple stages. The method further includes adjusting, by a trim control circuit, a bias of one of the stages of the power amplifier using a first set of trim bits from non-volatile memory. The method further includes scaling, by the trim control circuit, the bias of one of the stages of the power amplifier by an integer between 0 and $2^n-1$ corresponding to a binary number formed by the first set of trim bits, for which n corresponds to the number of trim bits.

For example, the method may further include storing, by a digital control block, the first set of trim bits in non-volatile memory. The method may further include transferring, by the digital control block, the stored first set of trim bits to the trim control circuit.

The trim control circuit may include switches corresponding to the first set of trim bits.

The method may further include modifying, by a phase controller circuit, based at least in part on a phase offset, a phase of an output signal of a first antenna. The modified phase of the output signal may enable a pre-calibration of the output signal. The method may further include adjusting, by the trim control circuit, a tunable parameter of the phase controller circuit using a second plurality of trim bits from non-volatile memory.

The method may further include modifying, by a gain controller circuit, based at least in part on a gain offset, an amplitude of the output signal of the first antenna. The modified amplitude of the output signal may enable a pre-calibration of the output signal. The method may further include adjusting, by the trim control circuit, a tunable parameter of the gain controller circuit using a third plurality of trim bits from non-volatile memory.

The method may further include providing, by multiple antennas including the first antenna, multiple radio signals to a point in space where the radio signals constructively interfere with each other to form a directionally controlled beam.

The method may further include transferring, by the digital control block, a fourth plurality of trim bits to another trim control circuit configured to adjust another bias of another power amplifier, for which the other power amplifier is configured to at least amplify another output signal of another one of the plurality of antennas.

The method may further include adjusting, by the other trim control circuit, the other bias such that an error vector magnitude is minimized for an output power of the output signal from the antenna and another output power of the other output signal from the other antenna, for which the output power equals the other output power.

The method may further include adjusting, by the other trim control circuit, the other bias such that an output power is maximized for an error vector magnitude of the output signal of the antenna and another error vector magnitude of the other output signal of the other antenna, for which the error vector magnitude equals the other error vector magnitude.

The method may further include adjusting, by the other trim control circuit, the other bias such that an output power at 1-db compression of the output signal of the antenna equals another output power at 1-db compression of the other output signal.

The method may further include adjusting, by the trim control circuit, a tunable parameter to a low gain configuration or a high gain configuration.

The method may further include comparing, by a skew detector, a skewed tunable parameter to an expected value for the skewed tunable parameter. The method may further include computing, by a processor, a fifth plurality of trim bits to adjust the skewed tunable parameter. The method may further include transferring the fifth plurality of trim bits to the digital control block. The digital control block may be configured to store the fifth plurality of trim bits in non-volatile memory.

The method may further include adjusting, by the trim control circuit, a frequency band response for a beam formed by the plurality of antennas.

Systems and methods consistent with this approach are described, as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

When practical, similar reference numbers denote similar structures, features, or elements.

DETAILED DESCRIPTION

Figure 1A:
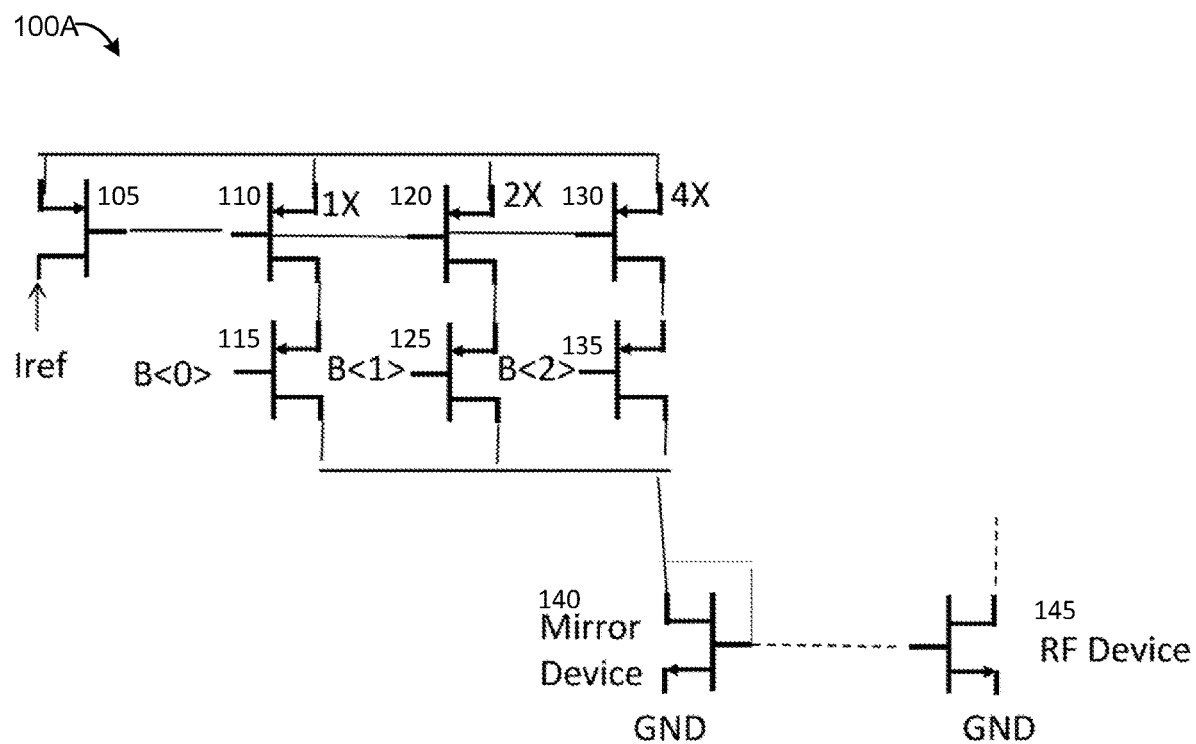
FIG. 1A depicts an example of a circuit for adjusting bias of an RF device using trim bits.

Integrated circuits for active electronically steered antennas and other devices may have non-idealities or deviations due to variations in the circuit manufacturing processes or other factors. These non-idealities or deviations may be adjusted for by designing in tunable circuit elements that are tuned based on adjustment parameters stored as trim bits. The designed in tunable circuit elements may use the trim bits to determine the degree of adjustment, to adjust a bias, gain, power level, error vector magnitude, phase, resistance, capacitance, frequency response, or other tunable parameter.

For example, a beamforming integrated circuit may include tunable circuit elements alter the bias point for various sub-circuits, the bias relationship to temperature, gain and phase setting, and other tunable parameters in each element of an antenna array. These adjustment settings or trim settings may be invisible to the end user of a product. Each trim setting may be given a default value that is set during a startup sequence when the part is first powered on. These default values can be changed, and the values stored, in non-volatile memory.

An example design flow is to fabricate integrated circuits based on a design, evaluate parts from early fabrication runs, and adjust trim settings for optimum performance. The trim settings may be locked in, and stored as trim bits in non-volatile memory. These locked-in trim bits may be invisible to customers, and may be applied without extra programming.

The trim settings may also be used to improve production yield. For example, integrated circuit may need to meet an output power at 1-db compression (OP 1 dB) requirement. The output power at 1-dB compression may be sensitive to one or more bias settings in a power amplifier circuit of an antenna. Adjusting these bias settings may improve the output power at 1-dB compression performance, resulting in more parts passing production requirements and improving yield. The trim settings can then be locked in via non-volatile memory, resulting in higher percentages of parts that meet the output power at 1-db compression requirement.

Similarly, other parameters that are important to a product specification may be optimized using trim settings. For example, the error vector magnitude is used to quantify differences between observed transmitted signals and desired reference signals. These differences or errors are captured in error signals. The error vector magnitude quantifies the magnitude or root mean square of the error signal, normalized by the root mean square power of the expected reference signal. The error vector magnitude (EVM) may be defined in dB, as $$EVM(\text{dB}) = 10\log_{10}\left(\frac{P_{error}}{P_{reference}}\right),$$

or as a percentage, as $$EVM(\%) = \sqrt{\frac{P_{error}}{P_{reference}}} \times 100\%.$$

Both amplitude and phase errors in beamforming array elements may contributed to an increased error vector magnitude for a beamforming antenna.

A manufacturing specification may require that the error vector magnitude fall below a specified limit at a fixed output power. Alternatively, a user may want the power to be greater than a particular power threshold when the error vector magnitude reaches a particular limit. In either case, the trim settings may be adjusted to achieve both better average performance and better yield to a specification.

In addition, trim settings may be used to compensate for part to part variation caused by variations in manufacturing processes. Yield may be improved by analyzing data from skew detectors embedded in integrated circuits to determine if a process wafer or lot is skewing towards faster or slower transistor performance, higher or lower capacitance, or other process variations. Next, trim settings may be adjusted to compensate for detected variations, the corresponding trim bits stored in non-volatile memory, and the trim bits used to compensate for the trends detected by analyzing data from skew detectors.

Frequency sensitive elements may be used to change the band response for a beamformer. Frequency sensitive element may be made from switched capacitors or inductors, tunable capacitors, such as varactors, or tunable inductors. The tunable elements may be adjusted to flatten the gain response across a required bandwidth, or shift the tuning to achieve better performance or increase product yield. The trim bits corresponding to these trim settings may be stored in non-volatile memory.

In addition, the overall system performance of an array may be improved by adjusting tunable parameters with trim bits. For example, the amount of output power at 1-dB compression may be programmed to be the same for a fixed input power across multiple devices or array elements. In other examples, each array element may need to operate at a fixed amount of compression even if the power from each device is different. This may help improve the error vector magnitude and overall linearity of the system. Non-volatile memory may be used in production to program trim bits to achieve these results.

Trim bits in non-volatile memory may also be used to lock in the state of a multi-use part. For example, a single design may be configured to operate in either a low gain configuration or a high gain configuration, based on the value of one or more trim bits. Therefore, trim bits in non-volatile memory can be used to fix the state of a multi-use part, and enable a single design for both cases. In another example, the output power of a part may be set using trim bits stored in non-volatile memory. Therefore, trim bits can be used to configure the state of a multi-use part to operate as two or more different parts based on the value of the trim bits.

FIG. 1A depicts an example of a circuit 100A for adjusting bias of an RF device using trim bits. The circuit 100A multiplies an input reference current Iref at transistor 105 by a factor of 0, 1, 2, 3, 4, 5, 6, or 7, depending on which pathways in the circuit 100A are closed.

The first pathway on circuit 100A includes transistor 110 with a multiplicative factor of unity (1×). The first pathway on circuit 100A also includes switch 115 that closes when trim bit B<0> has a value of 1, but is open when trim bit B<0> has a value of 0. The second pathway on circuit 100A includes transistor 120 with a multiplicative factor of two (2×) and switch 125 that closes when trim bit B<1> has a value of 1 and opens when trim bit B<1> has a value of 0. The third pathway on circuit 100A includes transistor 130 with a multiplicative factor of four (4×) and switch 135 that closes when trim bit B<2> has a value of 1 and opens when trim bit B<2> has a value of 0. In other examples, each of switches 115, 125, and 135 may open with the respective trim bit has a value of 0 and close when the respective trim bit has a value of 1. The size or current capacity of each of transistors 110, 120, and 130 is related to the number, width, and length of the gate fingers in each transistor according to the formula:

$$\text{current capacity} \propto \frac{(\text{number of gate fingers}) * (\text{width of gate fingers})}{\text{length of gate fingers}}.$$

Therefore, the number and width of gate fingers are proportional to current capacity, while the length of the gate fingers is inversely proportional to current capacity. The number, width, and length of gate fingers in each transistor may be adjusted so that the current capacity of transistor 130 is four times the current capacity of transistor 110, and the current capacity of transistor 120 is two times the current capacity of transistor 110.

The three trim bits B<2>, B<1>, and B<0> form a binary word that corresponds to whether switches 135, 125, and 115 are open or closed. If B<2>=B<1>=B<0> all have a value of 0 then the binary word that they form is 000, which corresponds to all three switches 135, 125, and 115 being open for a multiplicative factor applied to Iref of 0. If B<2>=B<1>=B<0> all have a value of 1 then the binary word that they form is 111, which corresponds to all three switches 135, 125, and 115 being closed for a multiplicative factor applied to Iref of 7. If B<2>=1 and B<1>=B<0>=0 then the trim bits form the binary word 100, switch 135 is closed and switches 125 and 115 for a multiplicative factor of 4. Therefore, the three trim bits B<2>, B<1>, and B<0> form a binary word corresponding to the multiplicative factor applied by circuit 100A. The final modified reference current from the circuit 100A can be added to another current mirror in a radio frequency section of a circuit. Transistor 140 has a known and fixed relationship to the radio frequency device 145. As such the circuit 100A will control the bias setting for the radio frequency device 145. The circuit 100A may be used to change the bias range from 0 to 7 times the reference current. It should be obvious to those skilled in the art that other ranges are possible by changing the relative size of the switchable mirrors and adding fixed offsets.

This example in FIG. 1A illustrates a trim control circuit with three trim bits. In other implementations, the number of trim bits may be increased or decreased, with corresponding more or fewer switches, multiplicative transistors, and trim bits. In general, a trim control circuit such as the trim control circuit of FIG. 1A may scale the bias of, for example, the third stage of a power amplifier, by an integer between 0 and $2^n-1$ corresponding to a binary number formed by n trim bits, for which n corresponds to the number of trim bits. The trim control circuit includes switches corresponding to the n trim bits. Each switch closes in response to the corresponding trim bit having a value of 1. Each switch opens in response to the corresponding trim bit having a value of 0.

Figure 1B:
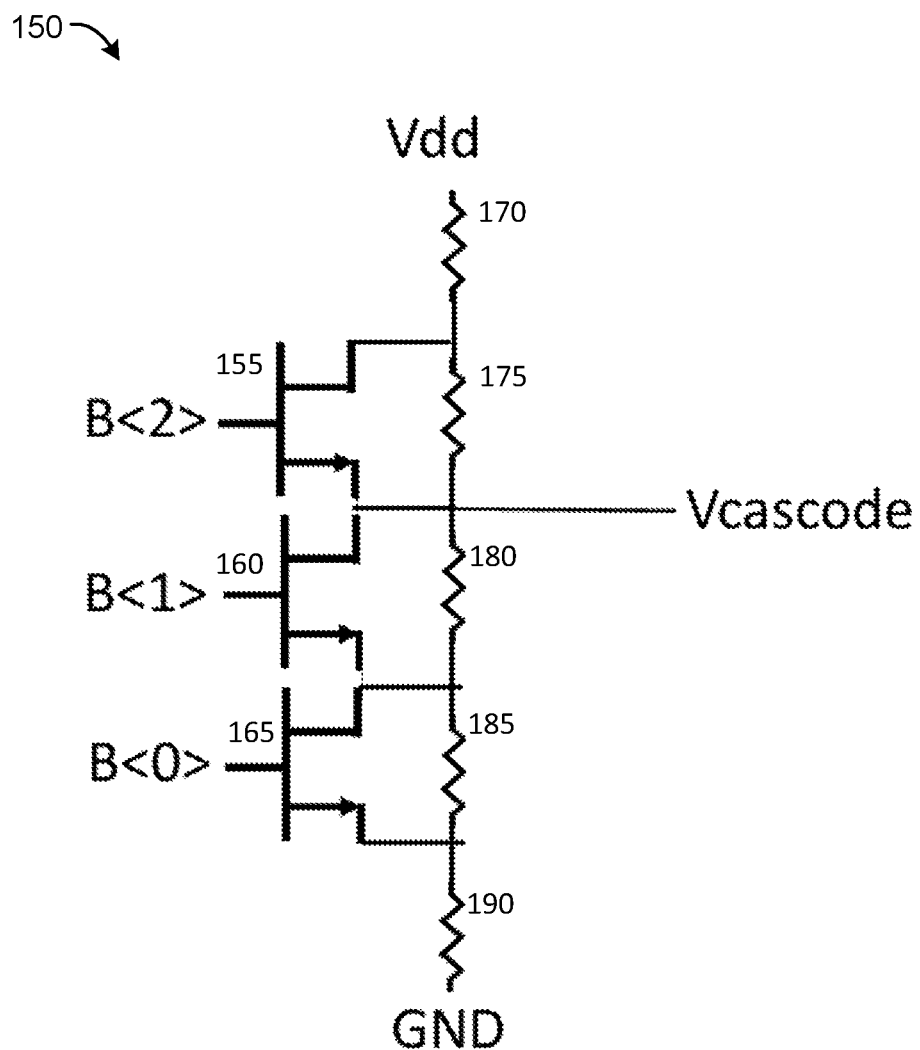
FIG. 1B depicts an example of a circuit for adjusting bias of a cascode amplifier using trim bits.

FIG. 1B depicts an example of a circuit 150 for adjusting bias of a cascode amplifier using trim bits. A stage of a power amplifier in an antenna may include a cascod device. Cascode circuit 150 includes a series of resistors 170, 175, 180, 185, and 190, from voltage Vdd at a first terminal of resistor 170 to ground GND at a second terminal of resistor 190. Resistors 170, 175, 180, 185, and 190 have resistances R170, R175, R180, R185, and R190. Voltage Vcascode is the voltage from the junction between resistor 175 and resistor 180.

Switch 155 terminates on either side of resistor 175. Switch 155 closes when trim bit B<2> equals 1 and opens when trim bit B<2> equals 0. When switch 155 closes, current flows across the switch instead of through resistor 175. Similarly, switches 160 and 165 terminate on either side of resistors 180 and 185, respectively, and close when each of corresponding trim bits B<1> and B<0> equal 1. Switches 160 and 165 open when each of corresponding trim bits B<1> and B<0> equal 0. Therefore, the three trim bits B<0>, B<1>, and B<2> independently cause corresponding switches 165, 160, and 155 to close or open in response to corresponding trim bits equaling 1 or 0. This enables eight different configurations and combinations of resistances in a cascode amplifier circuit.

This example in FIG. 1B illustrates a trim control circuit for a cascode with three trim bits. In other implementations, the number of trim bits may be increased or decreased, with corresponding more or fewer switches, resistors, and trim bits. The trim control circuit includes switches corresponding to the n trim bits. Each switch closes in response to the corresponding trim bit having a value of 1. Each switch opens in response to the corresponding trim bit having a value of 0.

Figure 2:
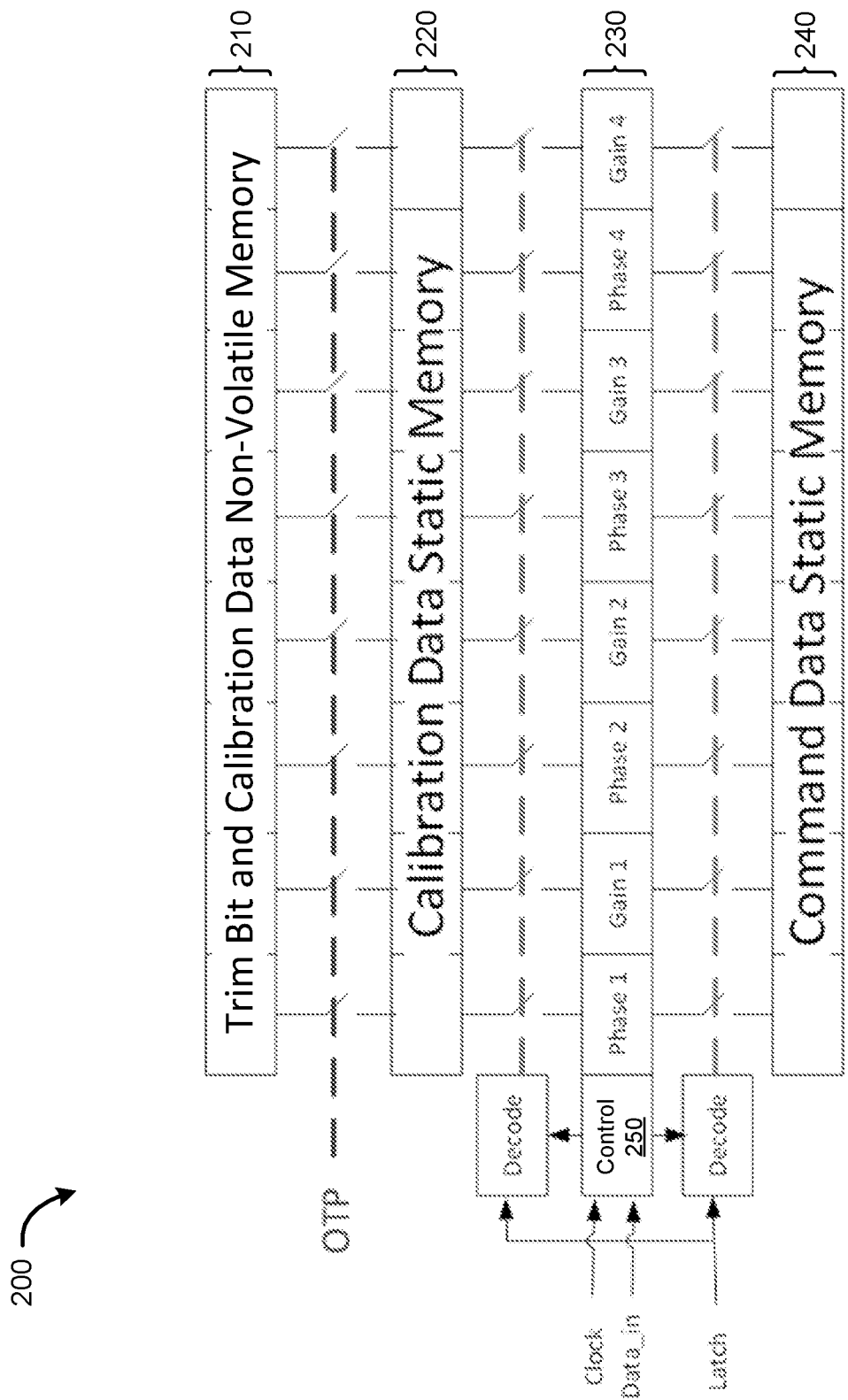
FIG. 2 depicts an example of a digital control block for a beamforming integrated circuit.

FIG. 2 depicts an example of a digital control block 200 for a beamforming integrated circuit. In various implementations, trim bits to adjust tunable parameters in the integrated circuit may be stored in non-volatile memory 210. In addition, after a gain and a phase of each path within the IC is measured (e.g., during test) and/or found to need correction, calibration data may be permanently stored on the IC. A control circuit or module 250 in the serial stream may determine if data clocked in is intended to be command data or calibration data. If the data is trim bit or calibration data then the data may be permanently stored on the IC using one-time programming (OTP) or other suitable process.

The non-volatile memory 210 storing the trim bit and calibration data may allow for the data to remain upon power down of the IC. In various implementations, after an IC is powered on, calibration data may be provided to the static memory 220 from the non-volatile memory 210. In some aspects, this process may be transparent to the host system, which is sending ideal gain and phase setting commands to the IC. Errors that are resident on the IC due to process variations may be internally corrected on the IC without need for intervention by the host system.

Once the trim bit and calibration data is stored in non-volatile memory 210 in the digital control block 200, the error vector magnitude, output power at 1-dB compression, power detection accuracy, gain and phase in each element arm may be corrected. For example, during execution, the phase and gain command data 230 for each element arm may be determined based upon the calibration data from the static memory 220 and/or command data from static memory 240.

Figure 3:
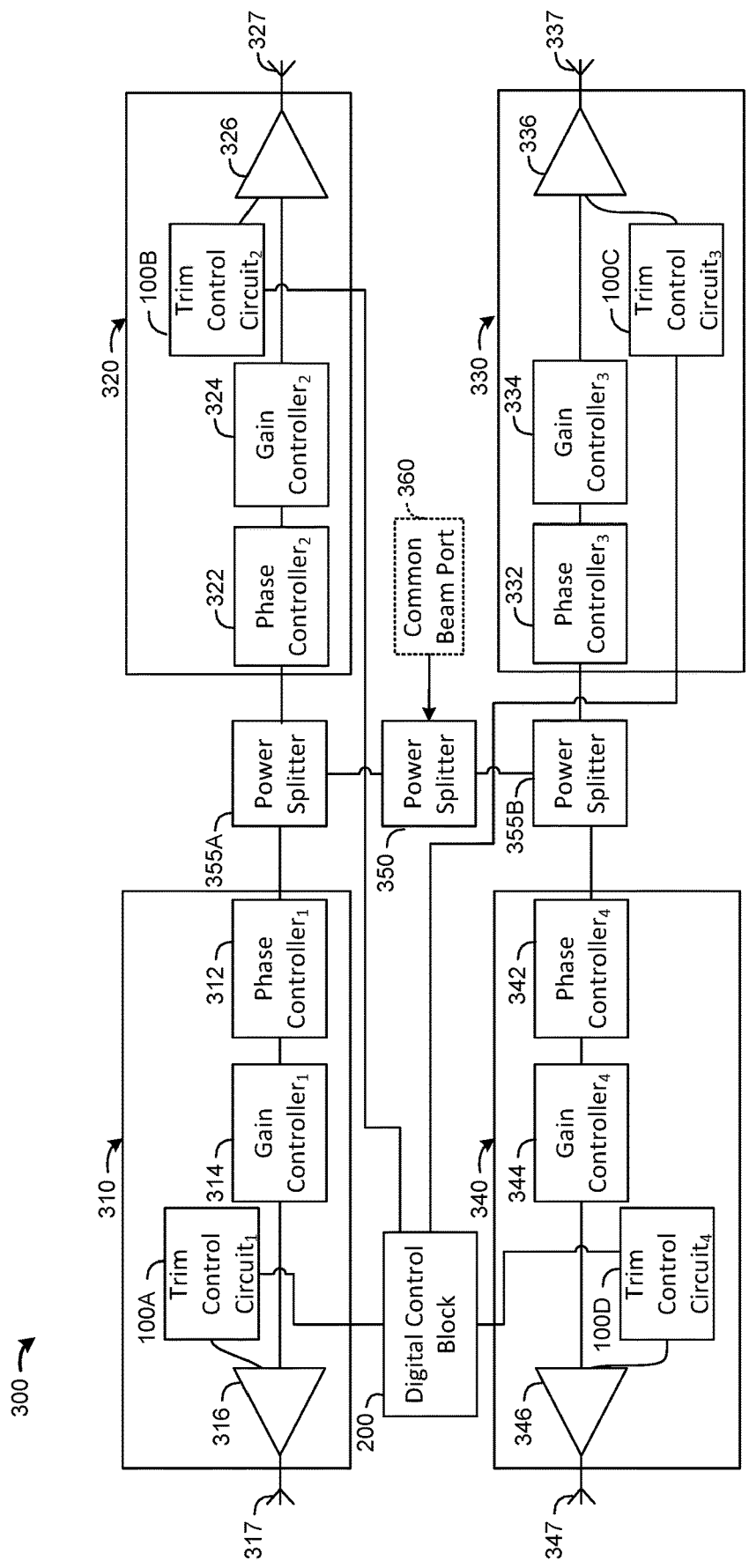
FIG. 3 depicts a block diagram of an example of a beamforming integrated circuit.

FIG. 3 depicts a block diagram of an example of a transmit beamforming integrated circuit (IC) 300. Beamforming IC 300 may be referred to as a beamforming network. The beamforming IC 300 may be implemented on one or more integrated circuits. Beamforming IC 300 is a four element array, with element arms 310, 320, 330 and 340. Element arm 310 components are labeled with a subscript of 1. Element arm 310 includes phase controller$_1$ 312, gain controller$_1$ 314, trim control circuit$_1$ 100A, and power amplifier$_1$ 316 connected to antenna 317. The phase controller$_1$ 312, gain controller$_1$ 314, and power amplifier$_1$ 316 are connected serially. The trim control circuit$_1$ 100A is also connected to power amplifier$_1$ 316. The trim control circuit$_1$ 100A is also connected to digital control block 200. Element arm 310 receives power from power splitter 355A. Trim control circuit 100A has the same structure of the trim control circuit 100A, described above with respect to FIG. 1A. Digital control block 200 has the same structure of the digital control block 200, described above with respect to FIG. 2.

The other element arms 320, 330, 340 may include the same or similar components in the same or similar layouts. Element arms 320, 330, and 340 include phase controllers 322, 332, and 342, gain controllers 324, 334, and 344, trim control circuits 100B, 100C, and 100D, and power amplifier 326, 336, and 346, respectively. The phase controllers 322, 332, and 342, gain controllers 324, 334, and 344, power amplifiers 326, 336, and 346, and antennas 327, 337, and 347, respectively, are connected serially. The trim control circuits 100B, 100C, and 100D, respectively, are also connected to power amplifiers 326, 336, and 346, respectively. Element arm 320 receives power from power splitter 355A. Element arms 330 and 340 receive power from power splitter 355B. Trim control circuits 100B, 100C, and 100D may have the same structure of power detector 100A, described above with respect to FIG. 1. The trim control circuits 100B, 100C, and 100D are also connected to digital control block 200.

Although the IC 300 is illustrated with four elements, more or fewer elements may be present in other implementations. Further, in various implementations, additional, fewer, and/or alternative components may be present within the IC 300. In various implementations, the IC 300 may include at least one receiver that connects to at least one antenna with at least one front end switch.

Power splitters 355A and 355B receive power from power splitter 350. A common beam port 360 may be provided to power splitter 350. Power splitters 350 may split received power in half, and route each half to power splitters 355A and 355B. Power splitter 355A may then split power received from power splitter 350 in half, and route each half to element arms 310 and 320. Similarly, power splitter 355B may split power received from power splitter 350 in half, and route each half to element arms 330 and 340. Just as different implementations may have more or fewer element arms, other implementations may have more or fewer power splitters.

The power amplifiers 316, 326, 336, and 346 of each element arm 310, 320, 330, and 340 may be provided to one or more antenna. The one or more antenna may or may not be on the beamforming IC 300. The use of gain and phase control (e.g., phase and gain together may constitute a complex beam weight for each element) may allow for beamforming in an antenna far field, as described herein. In some aspects, the difference between a desired phase and a measured phase may be referred to as a phase error. The difference between a desired amplitude and a measured amplitude may be referred to as an amplitude error. A phase error combined with an amplitude error may result in a vector error, which may cause misalignment in beams, thereby requiring calibration at the active antenna level.

Trim control circuits 100A, 100B, 100C, and 100D may include components of the trim control circuit 100A of FIG. 1, including transistors 105, 110, 120, 130, and switches 115, 125, and 135. The trim control circuits 100A, 100B, 100C, and 100D may receive trim bits stored in non-volatile memory 210 from digital control block 200. The trim bits may open or close each corresponding switch 115, 125, 135 to adjust a bias of the third stage of the power amplifiers 316, 326, 336, and 346.

In various embodiments, the trim control circuits 100A, 100B, 100C, and 100D may be connected to at least one of the power gain controllers 314, 324, 334, and 344. In various embodiments, the trim control circuits 100A, 100B, 100C, and 100D may be connected to at least one of the phase controllers 312, 322, 332, and 342. In various implementations, a trim control circuit 100A, 100B, 100C, and 100D may adjust other tunable parameters in at least one of the power amplifiers 316, 326, 336, and 346, the gain controllers 314, 324, 334, 344, or the phase controllers 312, 322, 332, and 342. In various embodiments, the trim control circuits 100A, 100B, 100C, and 100D may adjust at least one of a bias, a gain, a power level, an error vector measurement, a phase, a resistance, a capacitance, and a frequency response.

In various embodiments, the trim control circuits 100A, 100B, 100C, and 100D may adjust tunable parameters such that an error vector magnitude for the output power of output signals from an array of antennas, for which the antennas in the array emit a substantially constant output power.

In various embodiments, the trim control circuits 100A, 100B, 100C, and 100D may adjust tunable parameters such that output power from an array of antennas is maximized for a substantially constant error vector magnitude for the antennas in an array.

In various embodiments, the trim control circuits 100A, 100B, 100C, and 100D may adjust tunable parameters such that an output power at 1-db compression of the output signals of the antennas in the array are substantially equal.

The IC 300 may form at least a portion of an active antenna. Active antennas form electronically steerable beams, and are used in many radar and communications systems such as emerging 5G systems. In order to form a beam that spatially points in a given direction, beam steering must be applied such that energy from each radiating element may be coherently (e.g., in-phase, amplitude, and/or vector alignment) combined in the antenna's far field.

Active antennas may implement beam steering by providing a unique radio frequency phase shift and/or gain setting between each radiating element and a beam summation point. In some aspects, a beam summation point may be a point at which all of the signals generated by the active antenna converges, which may form a steerable beam. Thus, emission of separate radio wave signals which constructively interfere which each other may be used to steer a radio signal. However, in order for effective beamforming to be achieved, the energy from each element in the active antenna should arrive at the beam summation point at the same phase (e.g., via phase control), the same amplitude (e.g., via gain control), and/or the same vector orientation. Under certain circumstances, gain taper is utilized to improve the beam characteristics. Tapering may be used for side-lobe reduction or creating nulls the antenna array pattern. Often these well-defined patterns require accurate amplitude and phase calibration.

Some active antennas may calibrate an array of antenna elements by measuring the amplitude and phase at each element in the array in a near field antenna range. When all gain and phase states within the array are set to the same value, the measured gain and phase at each element will also be the same. However, this is generally not the case due to part-to-part variation within the beamforming ICs and/or other contributors in the array, such as passive beamforming networks, other ICs (e.g., on the wafer), and/or the like. When the gain and phase measured at each element are not the same, then the measured error at each element may be stored in an array look-up table and applied as an offset against the commanded amplitude and phase. However, this calibration process which requires continual monitoring, calculating, and updating may be time consuming and/or expensive for active antenna systems to employ.

When considering the sources of gain and/or phase error from path to path in the array, the dominant error may typically occur within the beamforming ICs. Passive power dividers and splitters may contribute relatively little error since they, by design, may be symmetric corporate feed structures (e.g., same line lengths on all paths), and/or since they are generally manufactured on a common printed circuit board (PCB) so some (if not all) paths may see the same or similar loss tangent and dielectric constant. Relative errors between/among the various paths in an array generally affect beamforming, whereas absolute changes in gain and phase in an array might not.

In some aspects, transmission phase variation (e.g., S21 phase variation) based on a Monte Carlo performed on a Ka-band (e.g., 26.5 GHz-40 GHz) beamforming transmission IC may be high. For example, a through-phase ±3 sigma process variation may be ±96 degrees. This may be extremely high compared to typical least significant bits (LSB) used in beam steering. For example, LSBs for four-bit, five-bit, and six-bit phase controllers may be 22.5 deg, 11.25 deg, and 5.625 deg, respectively. As systems may require all paths within an array to be matched within one LSB, processes for reducing the part-to-part variation in through-phase may be beneficial.

Elimination of high phase variation (and/or by similarity, gain variation) may be provided by correcting for variations on the beamforming IC (e.g., where the problem is rooted). In various implementations, a system may measure gain and phase of each path within the IC. For example, a membrane probe may be used to measure gain and/or phase differences between an input to a path and an output of the path (e.g., via one or more of the element arms 310, 320, 330, 340). In some aspects, the measurement process may be automated. Thereafter, based on the measurements, the system may program corrective calibration coefficient data into the IC in a permanent manner. For example, non-volatile programming may be achieved by using burning of fuses, one-time programming (OTP), electrically erasable programmable read-only memory (EEPROM), and/or other similar techniques or structures. In some aspects, the programming procedure(s) may also be automated.

In some aspects, correlation within a given die may negate the need to measure all paths within that die. For example, measurement of only one path and programming of the same calibration data into all paths may be implemented (e.g., to reduce IC test time). Additionally or alternatively, a process of reducing cost may leverage the high level of correlation of ICs within a given wafer. For example, in some aspects, a system may be configured to measure only one part (e.g., die) per wafer and/or program all die of the wafer with the same calibration coefficients. Additionally or alternatively, a system may be configured to measure a sample of ICs (e.g., die) on a given wafer and/or program all ICs from that wafer with average calibration coefficients.

Figure 4:
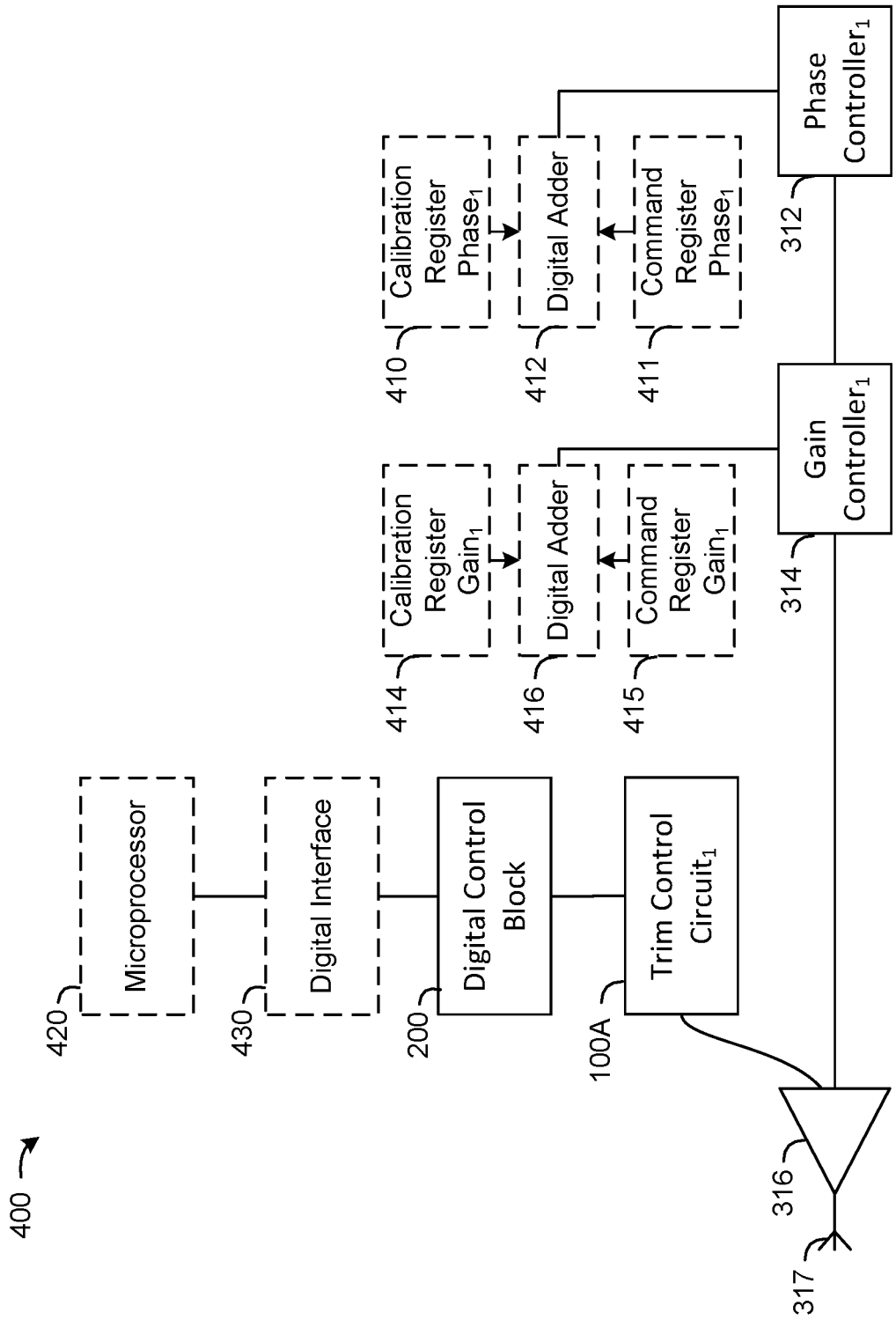
FIG. 4 depicts a block diagram of an example of an integrated circuit with calibration and trim control details.

FIG. 4 depicts a block diagram of an example of a transmission integrated circuit 400. In some aspects, the transmission integrated circuit 400 is part of an antenna that is not part of a beamforming antenna. In some aspects, the transmission integrated circuit is part of a beamforming antenna, for example for the element arm 310. The illustrated dashed-line blocks may be digital functions (e.g., adding two or more values to create a new value) and/or the illustrated solid-line blocks may be RF functions (e.g., modifying an RF signal provided to an antenna).

Microprocessor 420 may be a separate integrated circuit that interfaces to components of the transmission integrated circuit 400 via a digital interface 430. The digital interface 430 may be a bus that interfaces between the microprocessor 420 and at least digital control block 200. The digital interface 430 may be a serial parallel interface, that may be used to transmit trim bits from the microprocessor 420 to the digital control block 200 for storage in non-volatile memory 210. The digital interface 430 may also transmit calibration data from the microprocessor 420 to the digital control block 200 for storage in the non-volatile memory 210. The digital control block may also transmit trim bits and/or calibration data to other components in FIG. 4, including the gain controller$_1$ 314, the phase controller$_1$ 312, command register phase$_1$ 411, command register gain$_1$ 415, calibration register gain$_1$ 414, calibration register phase$_1$ 410, and power amplifier$_1$ 316. The digital interface 430 may also interface between the microprocessor 420 and corresponding components of element arms 320, 330, and 340.

Integrated circuit 400 uses the trim bits and calibration data from the digital control block 200. The illustrated dashed-line blocks may be digital function, such as adding two or more values to create a new value. The illustrated solid-line blocks may be RF functions, such as modifying an RF signal provided to an antenna.

For example, calibration register phase$_1$ 410 may include calibration data from a non-volatile memory source, or from a static memory source, and command register phase$_1$ 411 may include command data from a static memory source, which may change multiple times at runtime. Based upon the values from these two registers 410, 411, a second digital adder 412 may be used to determine the sum of the two values. The determined sum may then be applied as a phase offset to a signal provided to an antenna through the phase block 312. A gain offset may similarly be applied to the signal provided to the antenna through the use of a calibration register gain$_1$ 414, a command register gain$_1$ 415, a first digital adder 416, and the gain controller 314. Although illustrated in sequence, in some implementations, the phase controller 312 and the gain controller 314 may be combined (such as in a combined vector modulator described herein) and/or may occur in a different order. Similar calibration may be applied to each array element 320, 330, and 340 of FIG. 3.

The approaches described herein may reduce the path-to-path phase variation to be within ±½ LSB for gain and/or phase, or a desired goal. Thus, the IC 400 may only otherwise be limited by the native granularity of the gain and phase functions. In some aspect, this all-digital approach may not impact or complicate RF functions in a meaningful way. As a non-limiting example of a benefit of the systems and/or methods described herein, Active antennas may be able to produce high quality beams upon array power up without need for calibration. Similarly, addressing the system-level issues described herein that consumers face may add value to consumer products (e.g., in 5G wireless communication).

In some aspects, if other ICs are used in cascade with the calibrated IC (e.g., IC 400), or if other array errors are significant then system calibration may also be used.

Figure 5A:
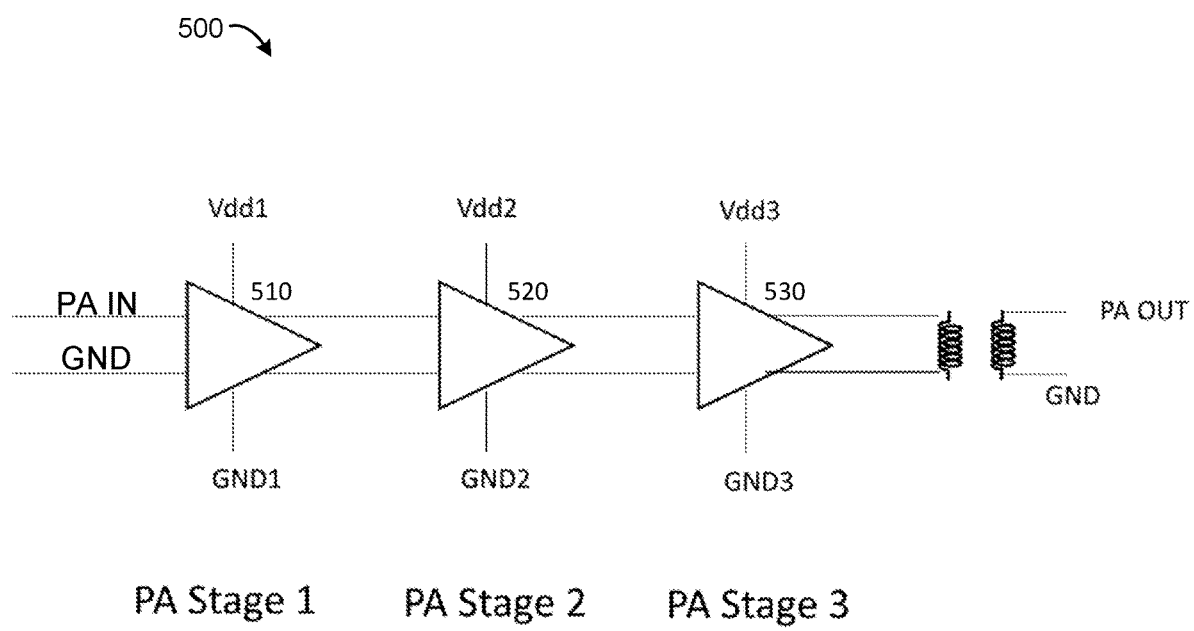
FIG. 5A depicts a block diagram of an example of a three stage power amplifier for use in a beamforming integrated circuit.

FIG. 5A depicts a block diagram of an example of a three stage power amplifier 500 for use in a beamforming integrated circuit. In various implementations, the power amplifiers 316, 326, 336, and 346 of FIG. 3 may correspond to the three stage power amplifier 500 of FIG. 5A. The three stage power amplifier 500 includes a first stage 510, a second stage 520, and a third stage 530. The first, second, and third stages 510, 520, and 530 are connected serially. First stage 510 amplifies input signal PA IN. Second stage 520 amplifies the output of the first stage 510. Third stage 530 amplifies the output of the second stage 520. In various implementations, the bias of the third stage of the power amplifier is adjusted using trim bits, since parameters including the error vector magnitude and the output power at 1-dB compression are sensitive to changes in the bias of the third stage of the power amplifier, such as the power amplifiers 316, 326, 336, and 346 of FIG. 3.

Figure 5B:
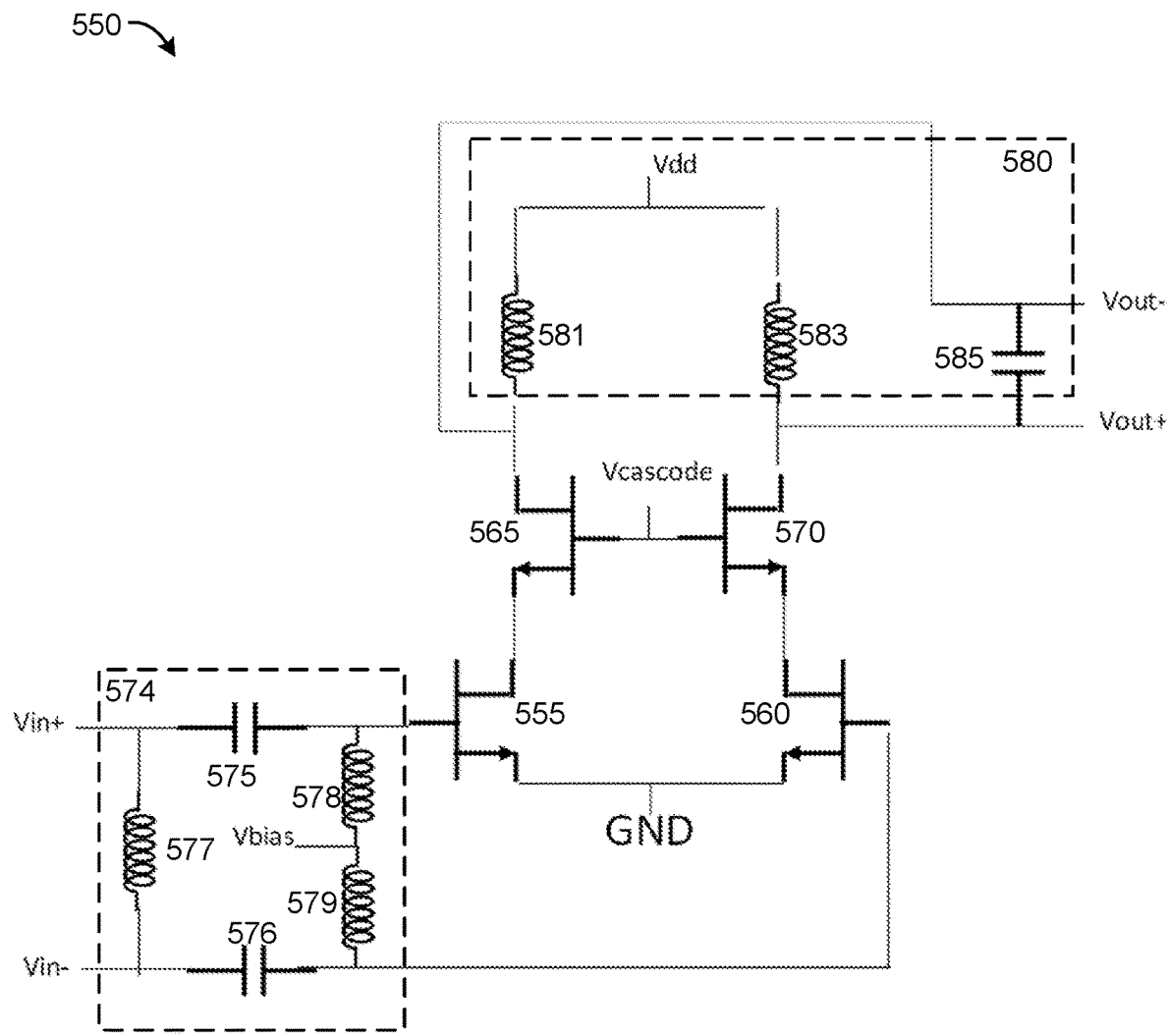
FIG. 5B depicts an example of a third stage circuit 550 of a power amplifier, for use in a beamforming integrated circuit.

FIG. 5B depicts an example of a third stage circuit 550 of a power amplifier, for use in a beamforming integrated circuit. The third stage circuit 550 receives input signals Vin+ and Vin− into an input matching network 574. Input signal Vin+ is coupled to a first terminal of a capacitor 575 within the input matching network 574. The other terminal of capacitor 574 is coupled to a field effect transistor (FET) 555 external to the input matching network 574. Similarly, input signal Vin− is coupled to a first terminal of a capacitor 576 within the input matching network 574. The other terminal of capacitor 576 is coupled to a field effect transistor (FET) 560 external to the input matching network 574. The input matching network 574 further includes inductor 577 between the Vin+ and Vin− input lines between these inputs and the first terminals of capacitors 575 and 576. The input matching network 574 further includes inductors 578 and 579, in series, with an intervening pin Vbias, between the the Vin+ and Vin− input lines, terminating between the second terminals of capacitors 575 and 576 and field effect transistors 555 and 560, respectively.

The common source field effect transistors (FETs) 555 and 560 are coupled to the input matching network 574 and amplify the input signals Vin+ and Vin−, respectively. The common source field effect transistors 555 and 560 are coupled to cascade field effect transistors (FETs) 565 and 570, respectively. The cascade FETs 565 and 570 output output signals Vout− and Vout+, respectively, to an output matching network 580. The output matching network includes inductors 581 and 583 in series, and capacitor 585. Cascode FET 565 outputs output signal Vout−, and is coupled to a first terminal of inductor 581 and a first terminal of capacitor 585. Cascode FET 570 outputs output signal Vout+, and is coupled to a first terminal of inductor 583 and a second terminal of capacitor 585.

The pin labeled Vbias is coupled to the circuit 100A in FIG. 1A and provides a programmable bias for the common source FETs 555 and 560. FETs 555 and 560 correspond to the radio frequency (RF) device 145 shown in FIG. 1A. The Pin labeled Vcascode is coupled to the cascode bias circuit 150 in FIG. 1B and provides a programmable bias to FETs 565 and 570. Capacitor 585 in the output matching network 580 may be replaced with a tunable capacitor for frequency tuning.

Figure 6:
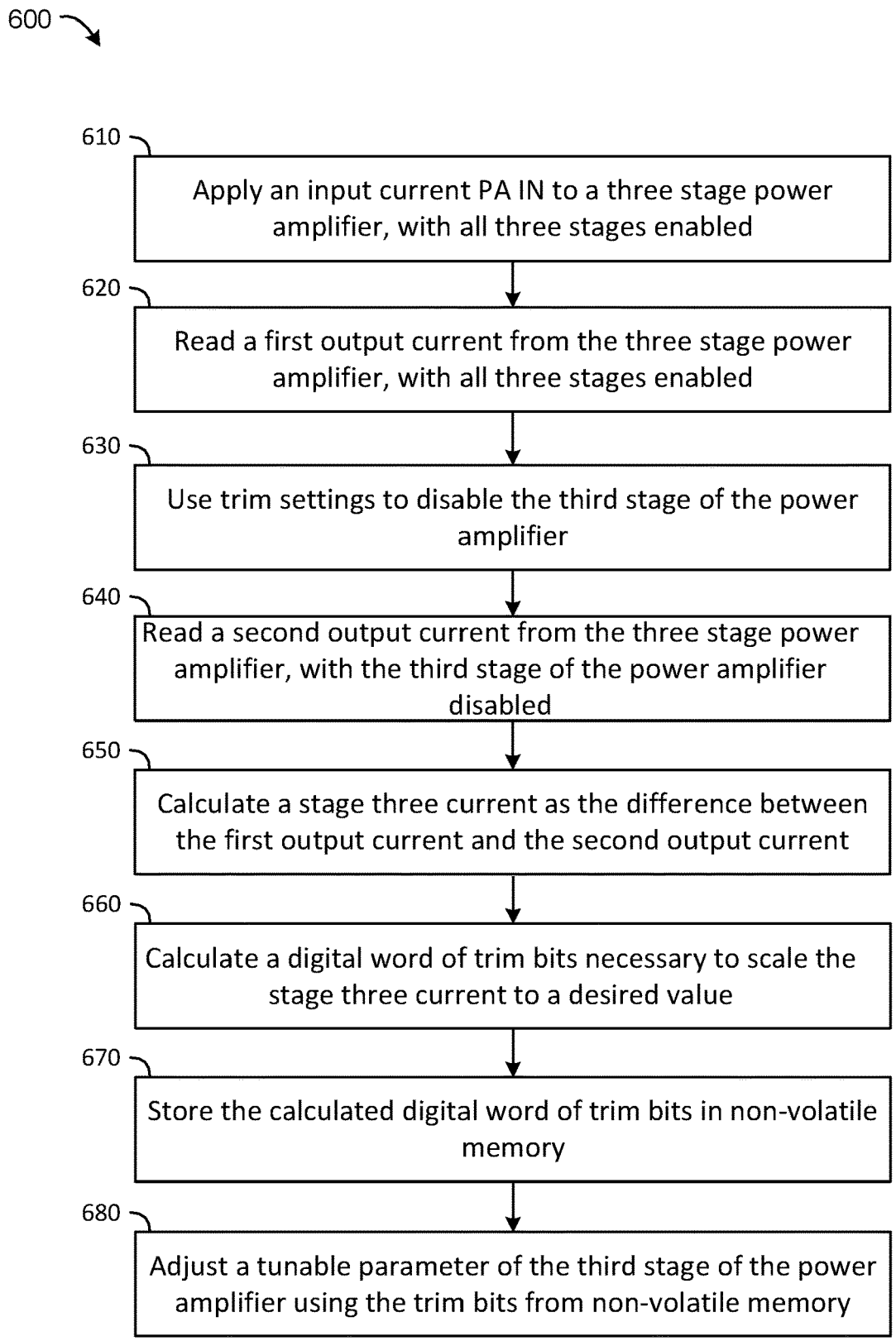
FIG. 6 depicts an example of a process for calculating trim bits and adjusting a tunable parameter of the third stage of a power amplifier of an antenna, in accordance with various implementations.

FIG. 6 depicts an example of a process 600 for calculating trim bits and adjusting a tunable parameter of the third stage of a power amplifier of an antenna, in accordance with various implementations. Similarly, the process 600 may be applied to another stages of the power amplifier, or another active block in the integrated circuit. In some aspects, the process 600 may be performed by at least a portion of the integrated circuit 400 of FIG. 4 and/or the three stage power amplifier 500 of FIG. 5. In some aspects, process 600 adjusts tunable parameters using trim bits for an antenna that is not part of a beamforming array. In some aspects, process 600 adjusts tunable parameters trim bits for an antenna that is part of a beamforming array.

In 610, a gain controller 314 may apply an input current PA IN to a three stage power amplifier 500, with all three stages enabled.

In 620, a microprocessor 420 may read a first output current from the three stage power amplifier 500, with all three stages enabled. The enabled first stage 510 of the power amplifier 500 may amplify the input current PA IN. Next, the enabled second stage 520 of the power amplifier 500 may amplify the output of the first stage 510. Finally, the enabled third stage 530 may amplify the output of the second stage 520. The resultant first output current represents amplification of input current PA IN by all three stages 510, 520, and 530 of the power amplifier 500.

In 630, a trim control circuit 100A uses trim settings to disable the third stage 530 of the power amplifier 500. For example, the trim control circuit 100A of FIG. 1A may disable the third stage 530 using trim bits of 0, 0, and 0 to open switches 115, 125, and 135.

In 640, the microprocessor reads a second output current from the three stage power amplifier 500, with the first two stages enabled and the third stage of the power amplifier disabled. The enabled first stage 510 of the power amplifier 500 may amplify the input current PA IN. Next, the enabled second stage 520 of the power amplifier 500 may amplify the output of the first stage 510. As the third stage 530 is disabled, second output current represents the current after amplification of PA IN by just the first two stages 510 and 520 of the power amplifier 500.

In 650, the microprocessor 420 calculates a stage three current as the difference between the first output current and the second output current, by subtracting the second output current from the first output current.

In 660, the microprocessor 420 calculates a digital word of trim bits necessary to scale the stage three current to a desired value. For example, if the bias of the third stage 530 of the power amplifier 500 needs to be doubled, a digital word of 010 may be stored for use with the trim control circuit of FIG. 1A.

In 670, the digital control block 200 stores the calculated digital word of trim bits in non-volatile memory 210.

In 680, the trim control circuit 100A adjusts a tunable parameter of the third stage of the power amplifier using the trim bits from non-volatile memory 210.

Figures 7A, 7B:
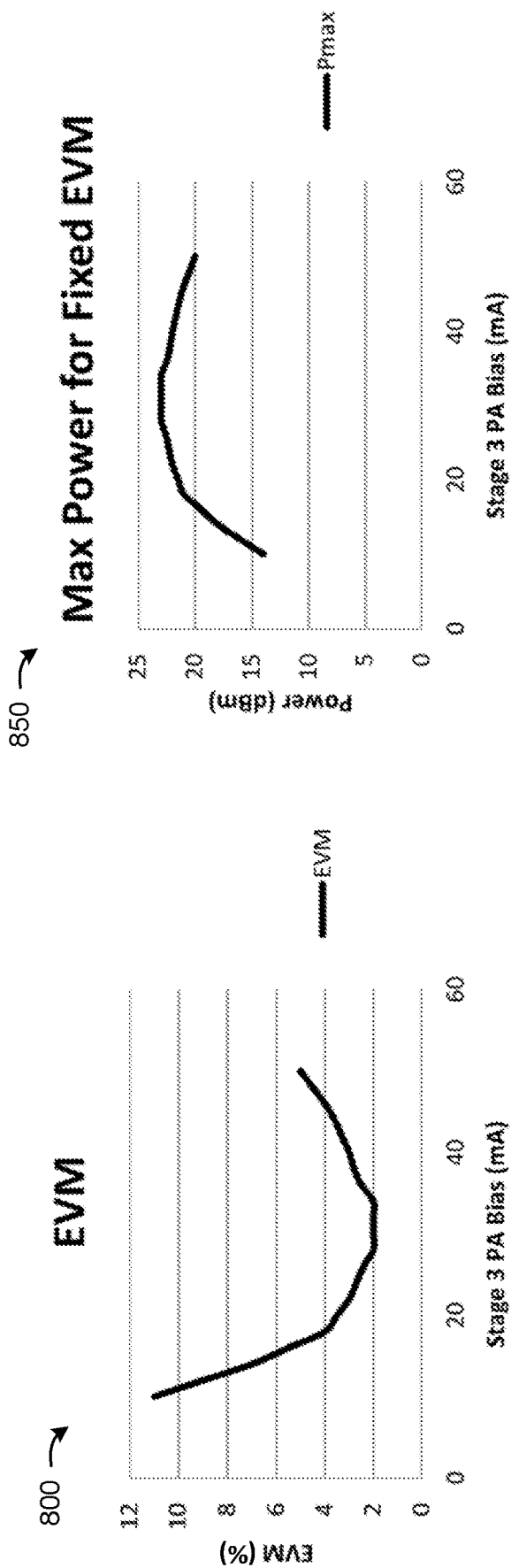
FIG. 7A is a graph illustrating an example relationship between the error vector magnitude and the bias of the third stage of a power amplifier for a beamforming integrated circuit.
FIG. 7B is a graph illustrating an example relationship between maximum power for a fixed error vector magnitude and the bias of the third stage of a power amplifier for a beamforming integrated circuit.

FIG. 7A is a graph 800 illustrating an example relationship between the error vector magnitude and the bias of the third stage of a power amplifier for a beamforming integrated circuit. In this example, the error vector magnitude may be reduced to 2% by adjusting the bias of the third stage of the power amplifier to approximately 30 mA. The error vector magnitude is sensitive to changes in the bias of the third stage of the power amplifier. In this example, the error vector magnitude doubles to 4% when the bias is either below 15 mA or above 45 mA. Therefore, the bias of the third stage of the power amplifier may be adjusted to minimize an error vector magnitude while holding input power constant.

FIG. 7B is a graph illustrating an example relationship between maximum power for a fixed error vector magnitude and the bias of the third stage of a power amplifier for a beamforming integrated circuit. In this example, the maximum output power may be increased to approximately 23 dBm by adjusting the bias of the third stage of the power amplifier to approximately 30 mA. The output power is sensitive to changes in the bias of the third stage of the power amplifier. In this example the output power is less than 20 dB when the bias is below 17 mA, and further increasing the bias above 35 mA does not increase the output power. Therefore, the bias of the third stage of the power amplifier may be adjusted to maximize output power for a fixed error vector magnitude.

Figure 8:
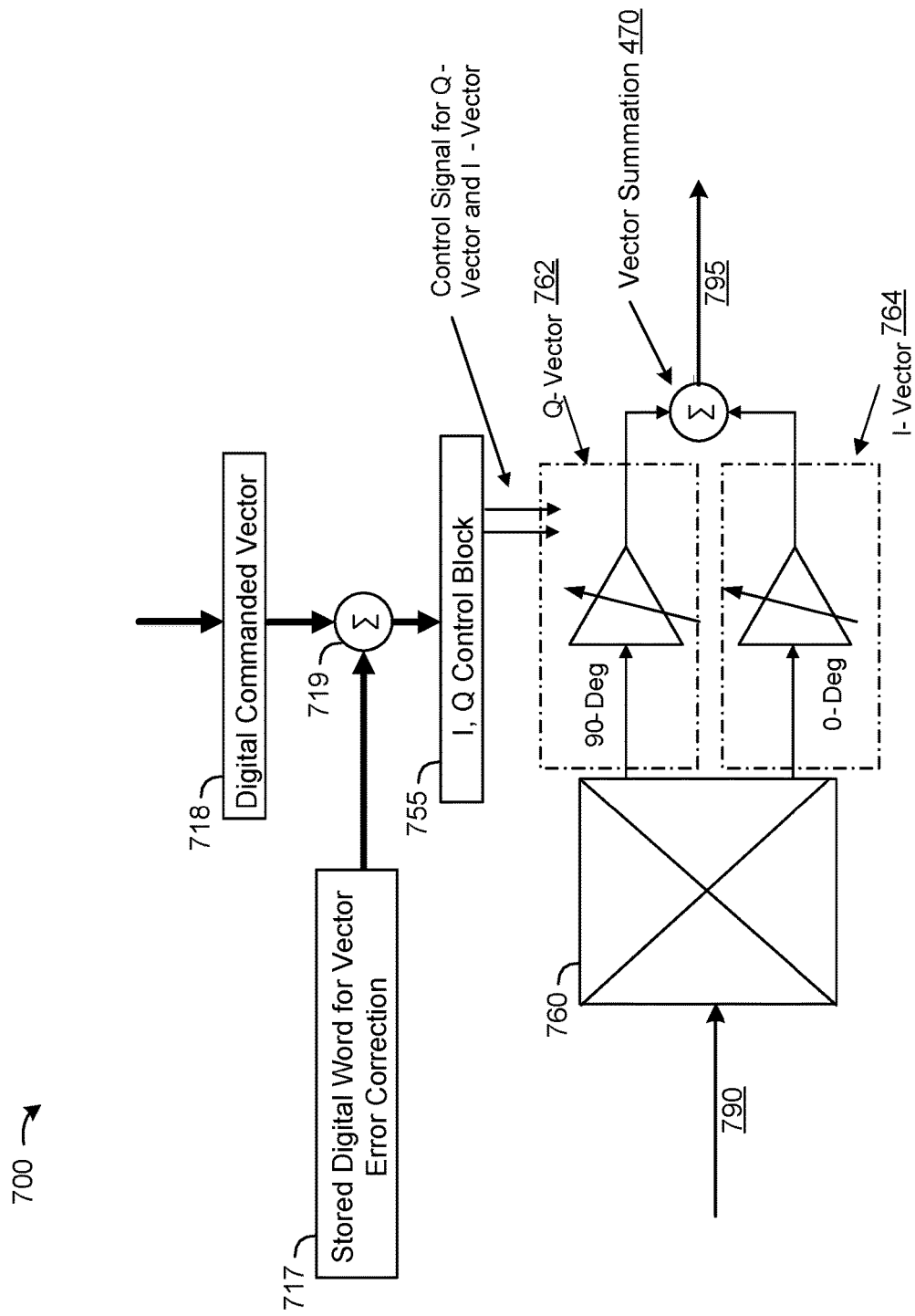
FIG. 8 depicts a block diagram of an example of a vector modulator.

FIG. 8 depicts a block diagram of an example of a vector modulator 700. As noted above, in various embodiments, functions of one or more of the phase controllers 312, 322, 332, and 342 (e.g., phase modification) may be combined with functions of the respective gain controllers 314, 324, 334, 344 (e.g., amplitude modification). The combined function(s) may be implemented through the use of the vector modulator 700. In some aspects, the vector modulator 700 may be implemented as an IQ vector modulator, which is capable of controlling both the amplitude and the phase of the transmitted signal at the same (or substantially the same) time.

As illustrated, the vector modulator 700 may include a hybrid module 760, which splits a received signal 790 (e.g., a signal generated by a power splitter 350, 355A, or 355B) into two signals which are 90-degrees out-of-phase from each other. These two signals may be referred to as the in-phase component (the "I" vector) and the quadrature-phase component (the "Q" vector). The two signals may be provided to an I-vector module 764 and a Q-vector module 762. As illustrated, each of the Q-vector module 762 and the I-vector module 764 may include a digital variable gain amplifier and/or a digital variable attenuator. These amplifiers and/or attenuators may be used to control the phase and/or amplitude of the input signal 790 such that the output signal 795 is the correct amplitude and/or phase for generation of an RF beam.

As illustrated, the phase and/or amplitude of the I-vector and the Q-vector may be controlled via an IQ control block 755. This control may be based on vector information obtained from memory, similar to the way that the phase shift and amplitude gain information is obtained, as described herein. For example, a digital word 717 for vector error correction from may be stored in non-volatile memory. This digital word 717 may be combined, during operation, with digital command vector 718 (e.g., stored in working memory) via the third digital adder 719. In some embodiments, the digital word is used in digital form. In other embodiments, the digital word is converted into an analog current and voltage (e.g., via a digital to analog converter) before it is used to modify the input signal 790. The stored digital word may reflect a vector error, which is a difference between a desired vector to a measured vector. As described herein, the vector error may be determined by testing one or more of the antennas, and in various embodiments the vector error is stored permanently on an IC. In some aspects, the vector error may be stored as a negative and/or the third digital adder 719 may be configured to add the negative of the vector error to command data to generate the desired control signal for an antenna.

The vector sum may be provided as an input to the IQ control block 755, which in turn provides one or more control signals to the Q-vector module 762 and/or the I-vector module 764. For example, in order to change the amplitude of the input signal 790, the vector modulator 700 may use an amplifier to modify the I vector and another amplifier to modify the Q vector, based on control signals, such that when the two components are combined, they are of a desired amplitude. A similar procedure may be performed to modify the phase of the input signal 790. In various embodiments, the vector modulator 700 may only correct for one of the amplitude or the phase of an input signal, and in other embodiments the vector modulator 700 may correct for both. In some aspects, the correction/modification may be performed through the use of a digital map. As further illustrated, vector summation circuit 770 (e.g., a combiner that combines the vector signals by adding them vectorally) may be used to combine the two components to form the output signal 795.

In some aspects, the resulting output signal 795 may be used to modify a signal provided to an antenna. In various implementations, each element arm 310, 320, 330, and/or 340 may include its own vector modulator 700, which may be alternative from (or in addition to) the separate gain and phase control blocks. Although a 90-degree shift is illustrated, other degrees of phase shift may be used (e.g., −90 degrees).

In some embodiments, the integrated circuit 400 of FIG. 4 and/or the vector modulator 700 of FIG. 7 may further comprise or otherwise utilize a resistor to generate a current. For example, a separate integrated circuit may be configured to utilize a resistor to generate the signal provided to the vector summation circuit 770, generated through the hybrid module 760, and/or a resistor utilized in another component in a chain of one or more components that ultimately provide the signal for use by the integrated circuit 400 or the vector modulator 700. In either event, a resistance of the resistor may be measured (e.g., before or after it is placed in the circuit), and this value may be used in conjunction with a desired current to determine a value of the voltage necessary to generate the desired current. The value of the voltage and/or the resistance may then be stored in non-volatile memory on the integrated circuit. In various embodiments, the voltage and/or the resistance value may be burned onto the IC through OTP or other processes described herein. The non-volatile memory storing the voltage value and/or the resistance value may include the calibration data non-volatile memory 210 or some other non-volatile memory. In some aspects, storing the voltage and/or the resistance in non-volatile memory may provide for pre-calibration of an IC.

Figure 9B:
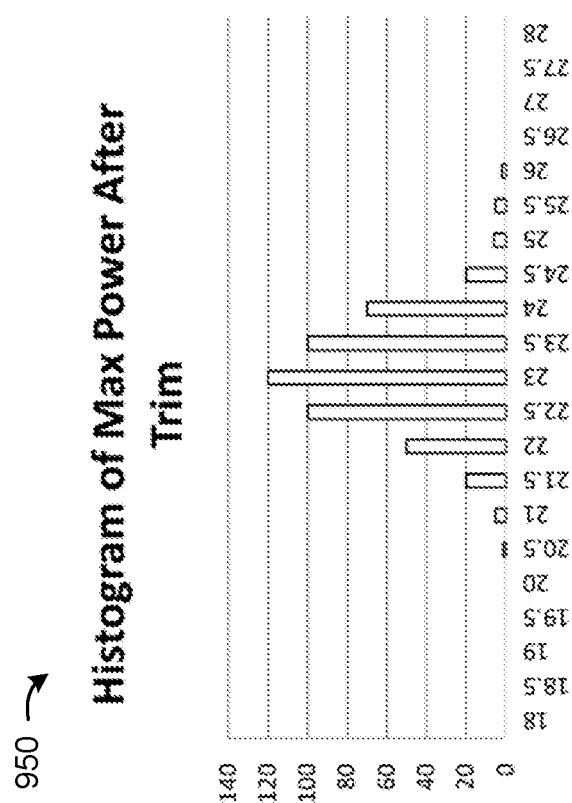
FIG. 9B is a histogram of maximum power for the example set of beamforming integrating circuits of FIG. 9A after adjusting tunable parameters using trim bits.
Figure 9A:
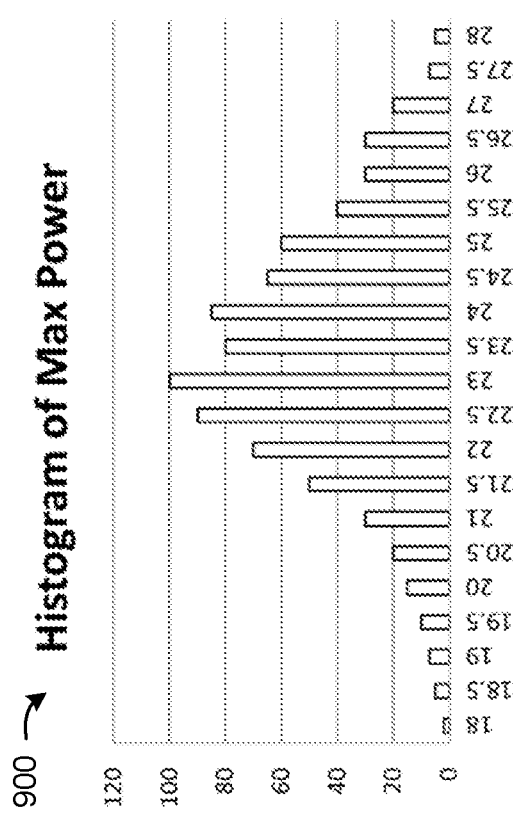
FIG. 9A is a histogram of maximum power for an example set of beamforming integrating circuits without adjusting tunable parameters using trim bits.

FIG. 9A is a histogram 900 of maximum power for an example set of beamforming integrating circuits without adjusting tunable parameters using trim bits. FIG. 9B is a histogram 950 of maximum power for the set of beamforming integrating circuits of FIG. 9A after adjusting tunable parameters using trim bits. Both histogram 900 and histogram 950 follow Gaussian distributions with peak counts at 23 mW, but adjusting tunable parameters using trim bits significantly reduces the variance of maximum power. This example illustrates using trim bits to reduce part-to-part variability.

Figure 10B:
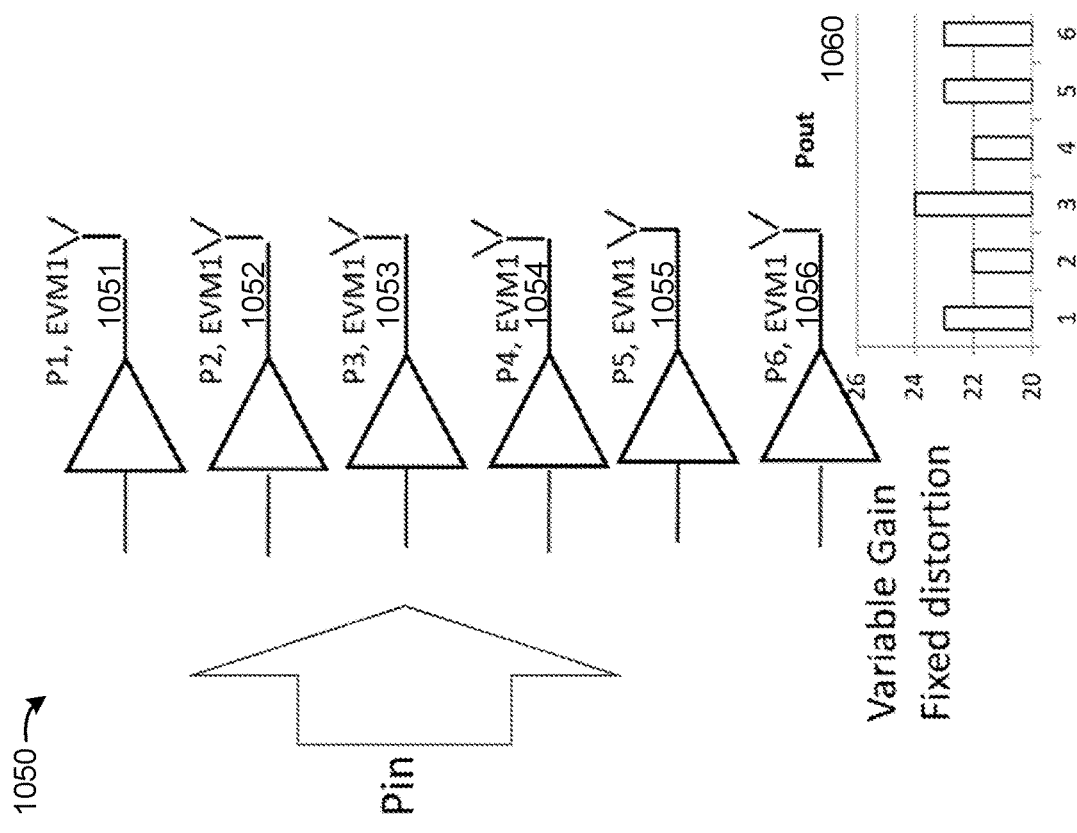
FIG. 10B depicts an example beamforming antenna array with a fixed distortion as measured by error vector magnitude and varying output power.
Figure 10A:
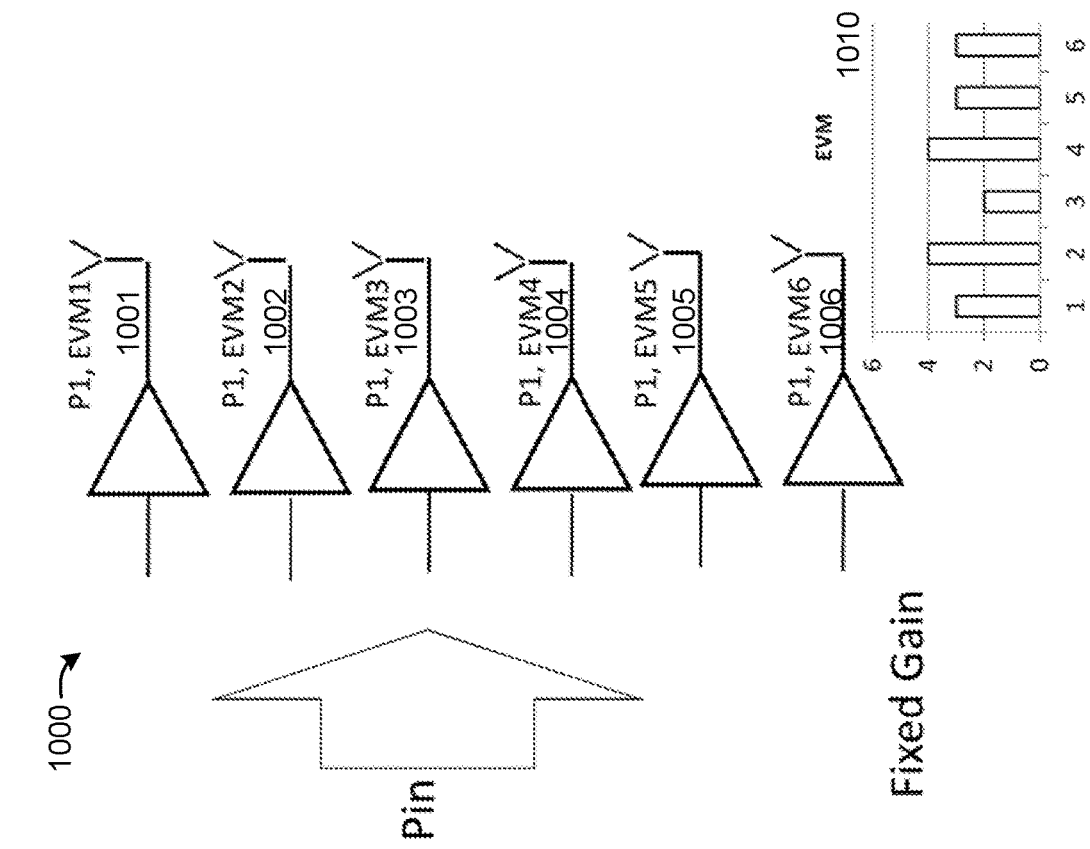
FIG. 10A depicts an example beamforming antenna array with a fixed gain across array elements and varying distortion as measured by error vector magnitude.

FIG. 10A depicts an example of a six element beamforming antenna array 1000 for which all six array elements 1001, 1002, 1003, 1004, 1005, and 1006 have substantially the same output power (P1). While the output power is held fixed, distortion as measured by the error vector magnitude for the corresponding array elements, EVM1, EVM2, EVM3, EVM4, EVM5, and EVM6 vary up to 4%, as illustrated in graph 1010. This example illustrates using trim bits to minimize the error vector magnitude for an antenna array with fixed output power across the array.

FIG. 10B depicts an example six element beamforming antenna array 1050 for which all six array elements 1051, 1052, 1053, 1054, 1055, and 1056 have substantially the same error vector magnitude. While the error vector magnitude is held fixed, the output power Pout for the corresponding array elements, P1, P2, P3, P4, P5, and P6, varies between 22 and 24 dB, as illustrated in graph 1060. This example illustrates using trim bits to maximize output power for an antenna array with fixed error vector magnitude across the array.

Figure 11:
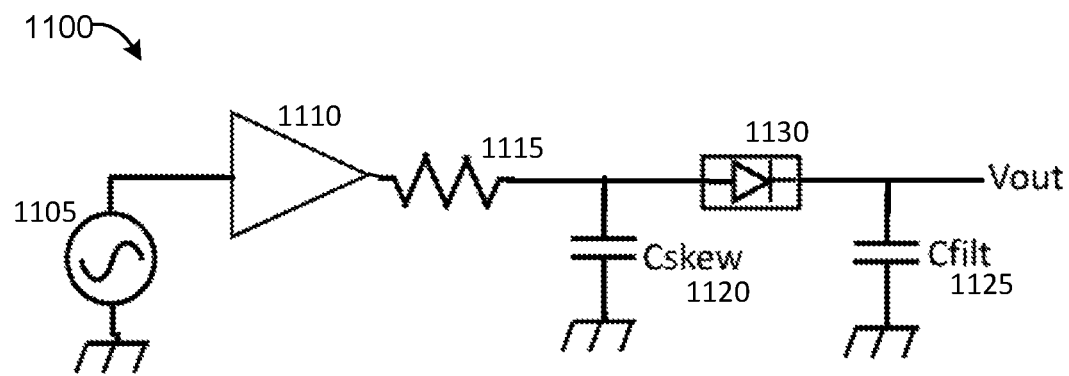
FIG. 11 depicts an example skew adjustment circuit for measuring and adjusting skew for an integrated circuit.

FIG. 11 depicts an example skew adjustment circuit 1100 for measuring and adjusting skew for an integrated circuit. The skew adjustment circuit may reside as circuitry peripheral to the main antenna path. This can be either part of the digital control block or reside with other analog circuitry such as bandgap or bias circuitry. A skew detector may be included on an integrated circuit. The skew adjustment circuit 1100 may be used to determine if a process wafer or lot is skewing towards faster or slower transistor performance, higher or lower capacitance, or other process variations. A way to improve yield may be to read data from skew detectors, adjust the trim settings to compensate for the detected variations, and lock the trim bits corresponding to these trim settings in non-volatile memory.

The skew adjustment circuit 1100 includes an AC voltage source 1105, an amplifier 1110, a resistor 1115, and a diode 1130 connected serially. The diode 1130 rectifies the voltage across Cskew 1120. A capacitor Cskew 1120 terminates between the resistor 1115 and the input terminal of the diode 1130. A capacitor Cfilt 1125 terminates by the output terminal of the diode 1130. Each of the resistance of resistor 1115, the capacitance of capacitor Cskew 1120, the capacitance of capacitor Cfilt 1125, and a threshold voltage of diode 1130 may each be adjusted with trim bits from non-volatile memory to compensate for skewing on a semiconductor wafer. If Cskew is smaller than average for a given wafer, the voltage across its terminals will be larger. Conversely, if the capacitance is larger, the voltage will be smaller. This voltage is rectified by diode 1130 and filtered by Cfilt to create a DC voltage proportional to the capacitance for a given wafer. This capacitance may then be read digitally via an analog to digital converter (ADC). Information about this capacitance may be processed by the microprocessor 420 and trim adjustments can be made and written to the non-volatile memory to correct for process variations.

Figure 12:
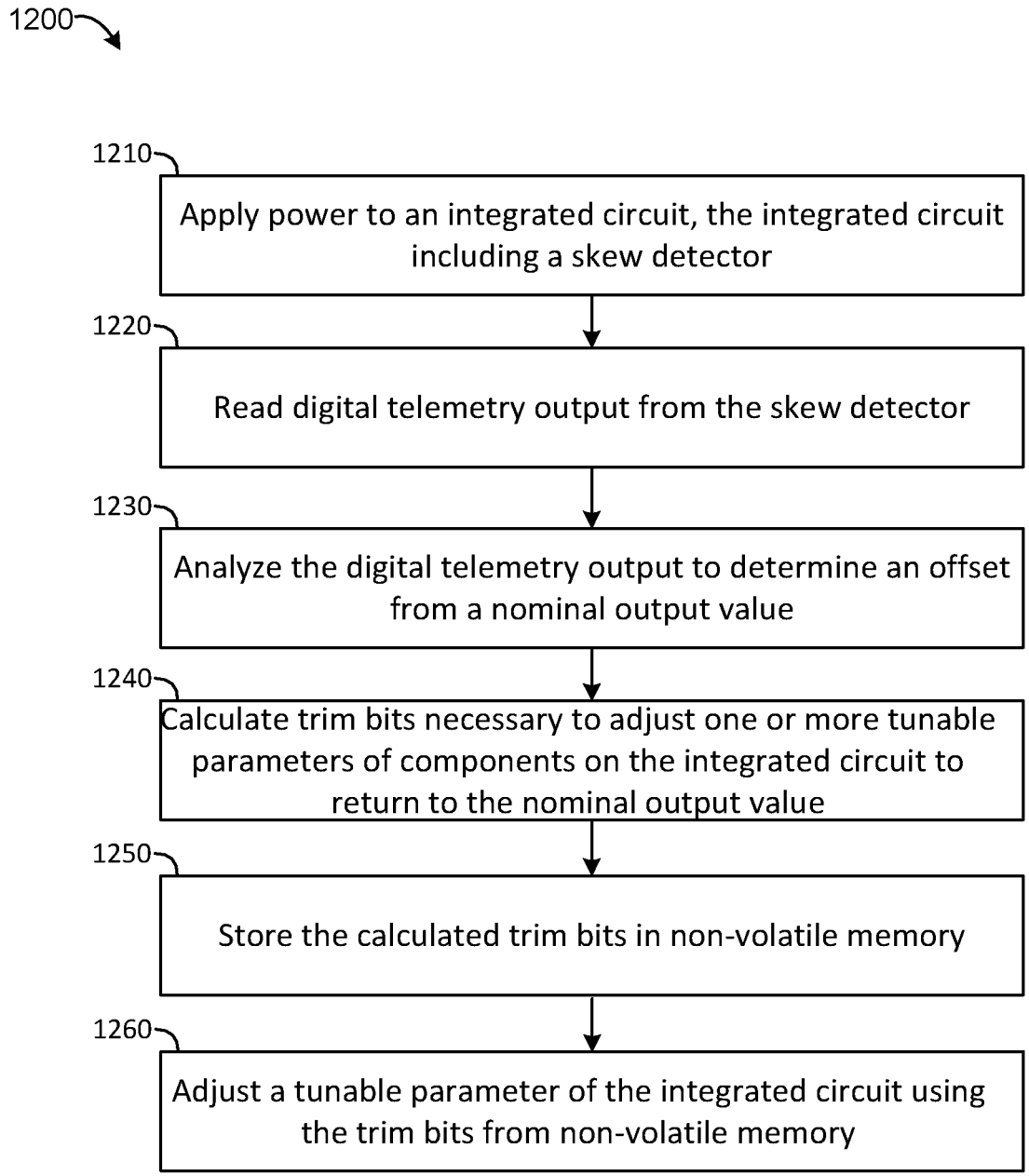
FIG. 12 depicts an example of a process, using the skew adjustment circuit of FIG. 11, for detecting skew, calculating trim bits, and adjusting a tunable parameter of an integrated circuit using the trim bits, in accordance with various implementations.

FIG. 12 depicts an example of a process 1200, using the skew adjustment circuit of FIG. 11, for detecting skew, calculating trim bits, and adjusting a tunable parameter of an integrated circuit using the trim bits. In some aspects, the process 1200 may be performed by at least a portion of the integrated circuit 400 of FIG. 4 and/or the skew adjustment circuit 1100 of FIG. 11. In some aspects, process 1200 adjusts tunable parameters using trim bits for an antenna that is not part of a beamforming array. In some aspects, process 1200 adjusts tunable parameters trim bits for an antenna that is part of a beamforming array.

At 1210, the microprocessor 420 causes a power source to apply power to an integrated circuit 400. The integrated circuit 400 includes a skew detector, such as the skew detector 1100 of FIG. 11.

At 1220, the microprocessor 420 reads digital telemetry output from the skew detector 1100. The digital telemetry output may indicate that a process wafer or lot that includes integrated circuit 400 is skewing towards faster or slower transistor performance, higher or lower capacitance, or other process variations.

At 1230, the microprocessor 420 analyzes the digital telemetry output to determine an offset from a nominal output value. For example, the microprocessor 420 may determine that the capacitances of a sample of capacitors on a wafer are 20% higher than desired die to fabrication process variations. As variations tend to be consistent across a single wafer, it may be sufficient to sample devices on a wafer to estimate skew instead of measuring telemetry for each one. Based on the digital telemetry output from the skew detector 1100, the microprocessor determines the offset that would correct for the calculated skew.

At 1240, the microprocessor 420 calculates trim bits necessary to adjust one or more tunable parameters of components on the integrated circuit to return to the nominal output value.

At 1250, the digital control block 200 stores the calculated trim bits in non-volatile memory 210.

At 1260, the trim control circuit 100A adjusts a tunable parameter of the integrated circuit 400 using the trim bits from non-volatile memory 210.

Figure 13A:
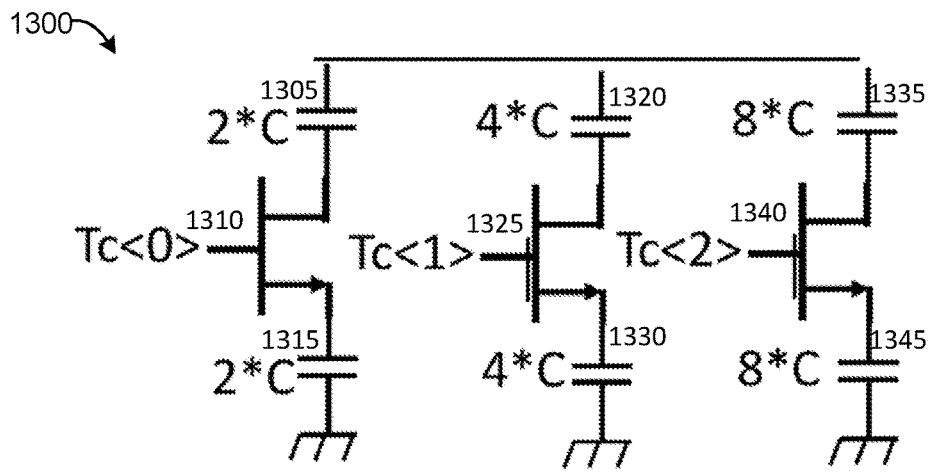
FIG. 13A depicts an example of a switched capacitor frequency tuning circuit.
Figure 13B:
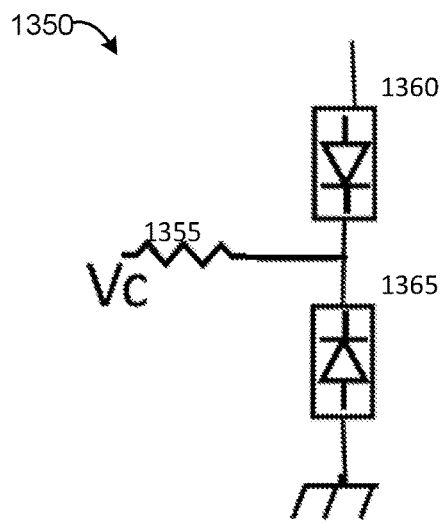
FIG. 13B depicts an example of a varactor based frequency tuning circuit.
Figure 13C:
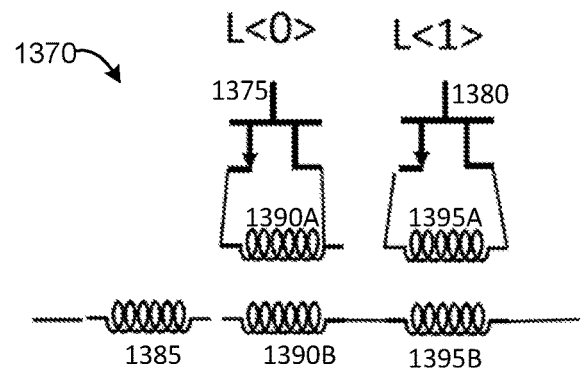
FIG. 13C depicts an example of a tunable inductor frequency tuning circuit.

FIGS. 13A, 13B, and 13C illustrate examples of frequency tuning circuits with tunable components. These frequency tuning circuits can be used in any part of the signal chain in the beamforming integrated circuit. For example, the tunable capacitor of FIG. 13A can be used in place of a conventional capacitor for a part of the power amplifier. Similarly, these could be used as part of the phase controller, gain controller, low noise amplifier, or any other element in the signal chain. FIG. 13A depicts an example of a switched capacitor frequency tuning circuit 1300 with three pathways connected in parallel. The first pathway includes capacitors 1305 and 1315, each with a capacitance of 2C, and intervening switch 1310. Switch 1310 is closed when trim bit Tc<0> has a value of 1, and open when Tc<0> has a value of 0. The second pathway includes capacitors 1320 and 1330, each with a capacitance of 4C, and intervening switch 1325. Switch 1325 is closed when trim bit Tc<1> has a value of 1, and open when Tc<1> has a value of 0. The third pathway includes capacitors 1335 and 1345, each with a capacitance of 8C, and intervening switch 1340. Switch 1349 is closed when trim bit Tc<2> has a value of 1, and open when Tc<2> has a value of 0. Therefore, the three trim bits Tc<0>, Tc<1>, and Tc<2> enable eight configurations for the switched capacity frequency tuning circuit 1300, enabling switched capacitor tuning from 0, when all the switches are open to 7C when all the switches are closed.

This example in FIG. 13A illustrates a trim control circuit with three trim bits. In other implementations, the number of trim bits may be increased or decreased, with corresponding more or fewer switches, capacitors, and trim bits. In general, a trim control circuit such as the trim control circuit of FIG. 13A may adjust a frequency response of an antenna with capacitances between 0 and $2^n-1$ corresponding to a binary number formed by n trim bits, for which n corresponds to the number of trim bits. The trim control circuit includes switches corresponding to the n trim bits. Each switch closes in response to the corresponding trim bit having a value of 1. Each switch opens in response to the corresponding trim bit having a value of 0.

FIG. 13B depicts a varactor based frequency tuning circuit 1350 with resistor 1355, diodes 1360 and 1365. The voltage Vc can be adjusted via a digital to analog converter (DAC) to change the reverse bias of each of the varactor diodes and effectively change the resulting capacitance across the parallel combination of diodes.

FIG. 13C depicts a tunable inductor frequency tuning circuit 1370 with switches 1375 and 1380, and inductors 1380, 1385A, 1385B, 1390A, and 1390B. Inductors 1385, 1390B, and 1395B are in series. Switch 1375 has a terminal on either side of inductor 1390A, which is in proximity to and aligned with inductor 1390B. Switch 1375 is open when trim bit L<0> has a value of 0, and closed when trim bit L<0> has a value of 1. Switch 1380 has a terminal on either side of inductor 1395A, which is in proximity to and aligned with inductor 1395B. Switch 1380 is open when trim bit L<1> has a value of 0, and closed when trim bit L<1> has a value of 1. Therefore, trim bits L<0> and L<1> enable four configurations of tunable inductor frequency training circuit 1370.

Figure 14A:
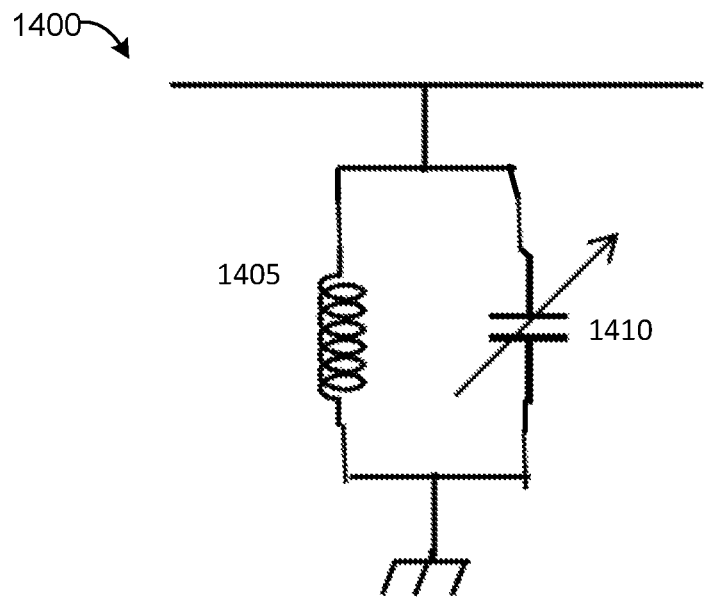
FIG. 14A depicts an example of a frequency tuning circuit with an adjustable capacitor and an inductor.

FIG. 14A depicts a frequency tuning circuit 1400 with an adjustable capacitor 1410 in parallel with an inductor 1405. Trim bits may be used to adjust the capacitance of capacitor 1410.

Figure 14B:
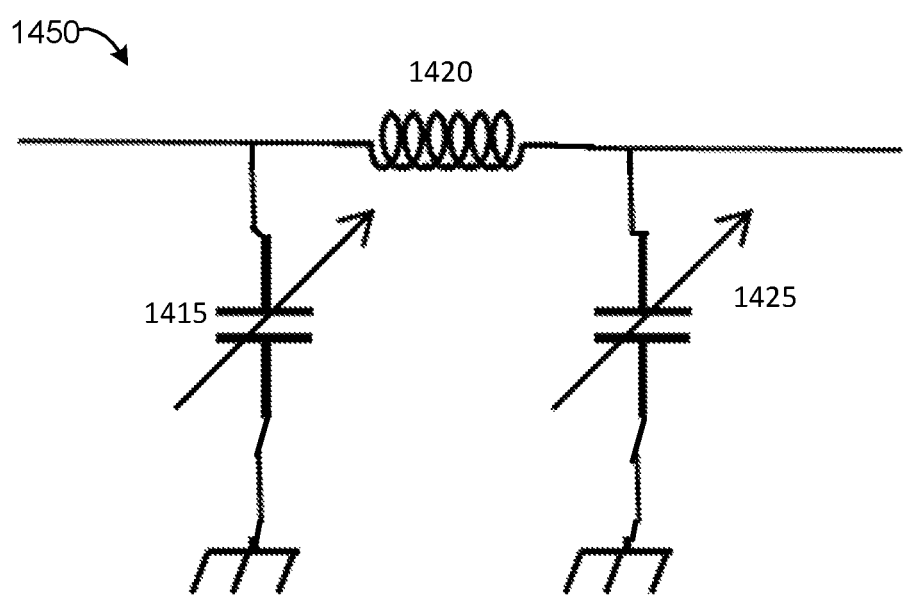
FIG. 14B depicts an example of a frequency tuning circuit with two adjustable capacitors and an inductor.

FIG. 14B depicts a frequency tuning circuit 1450 with two adjustable capacitors 1415 and 1425 and an inductor 1420. A terminal of capacitor 1415 is connected to a first terminal of inductor 1420. A terminal of capacitor 1425 is connected to a second terminal of inductor 1420. Trim bits may be used to adjust a capacitance for each of capacitors 1415 and 1425.

The frequency tuning circuits of FIGS. 14A and 14B may be used in the signal chain before the main radio frequency components to form a variable filter. For instance, the circuit of FIG. 14A forms a variable bandpass filter that can be used to create a positive, negative, or neutral slope with frequency depending on the trim setting used to change the capacitor. This filter could be placed before or between stages of the power amplifier 316, 326, 336, 346, or before one of the power splitters 350, 355A, 355B.

Figure 15:
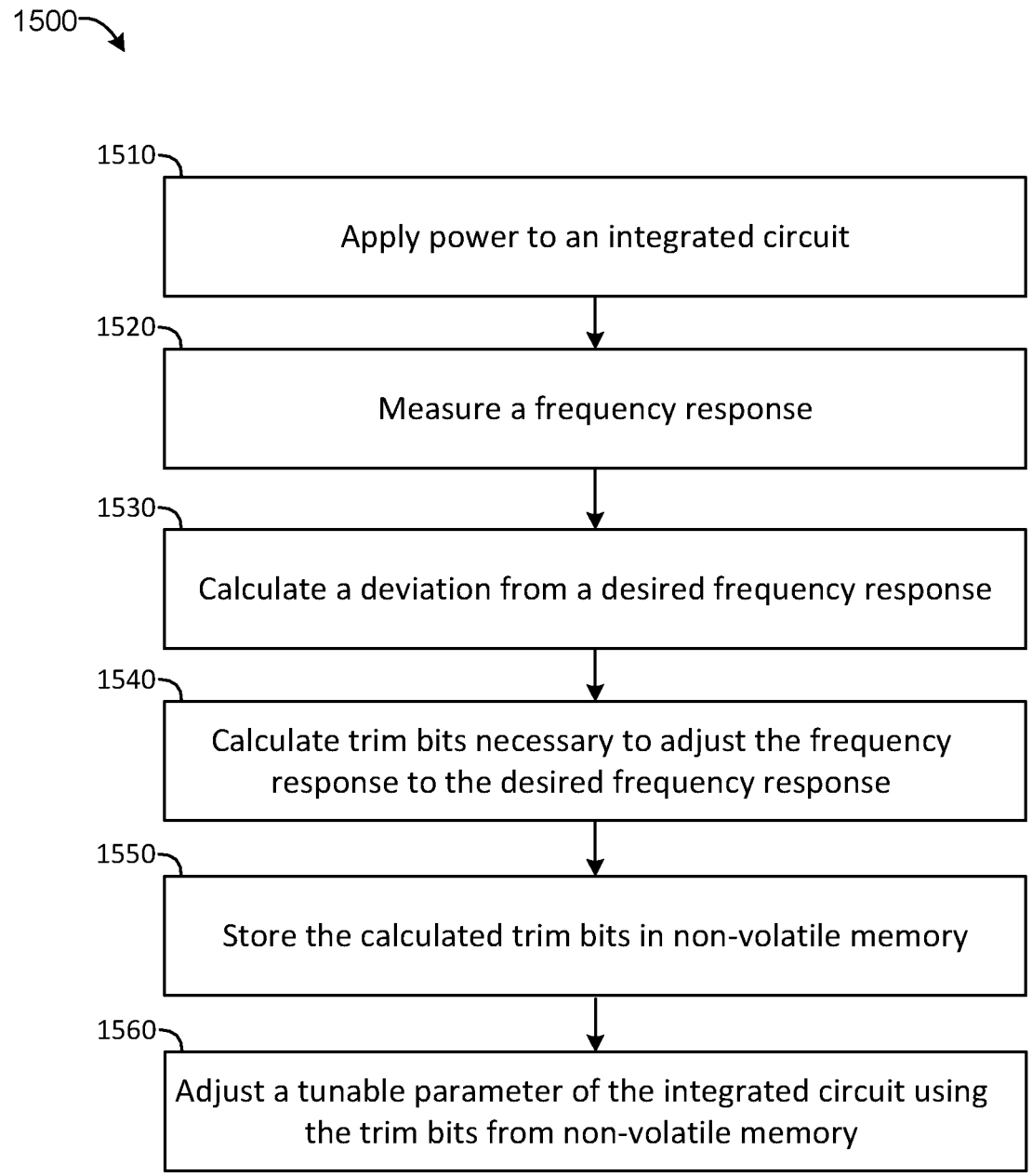
FIG. 15 depicts an example of a process for frequency adjustment using trim bits, by adjusting tunable parameters of frequency tuning circuits, such as the circuits depicted in FIGS. 13A, 13B, 13C, 14A, and/or 14B.

FIG. 15 depicts an example of a process 1500 for frequency adjustment using trim bits, by adjusting frequency tunable parameters of frequency tuning circuits, such as the circuits depicted in FIGS. 13A, 13B, 13C, 14A, and/or 14B, to adjust the frequency response of integrated circuit 400. In some aspects, the process 1500 may be performed by at least a portion of the integrated circuit 400 of FIG. 4 and/or circuits depicted in FIGS. 13A, 13B, 13C, 14A, and/or 14B. In some aspects, process 1500 adjusts tunable parameters using trim bits for an antenna that is not part of a beamforming array. In some aspects, process 1500 adjusts tunable parameters using trim bits for an antenna that is part of a beamforming array.

At 1510, a microprocessor 420 causes a power source to apply power to an integrated circuit 400.

At 1520, the microprocessor 420 measures a frequency response of a signal outputted by the integrated circuit 400.

At 1530, the microprocessor 420 calculates a deviation from the desired frequency response.

At 1540, the microprocessor 420 calculates trim bits necessary to adjust the frequency response to the reference or desired frequency response.

At 1550, the digital control block 200 stores the calculated trim bits in non-volatile memory 210.

At 1560, the trim control circuit 100A adjusts a tunable parameter of the integrated circuit 400 using the trim bits from non-volatile memory 210.

Figure 16:
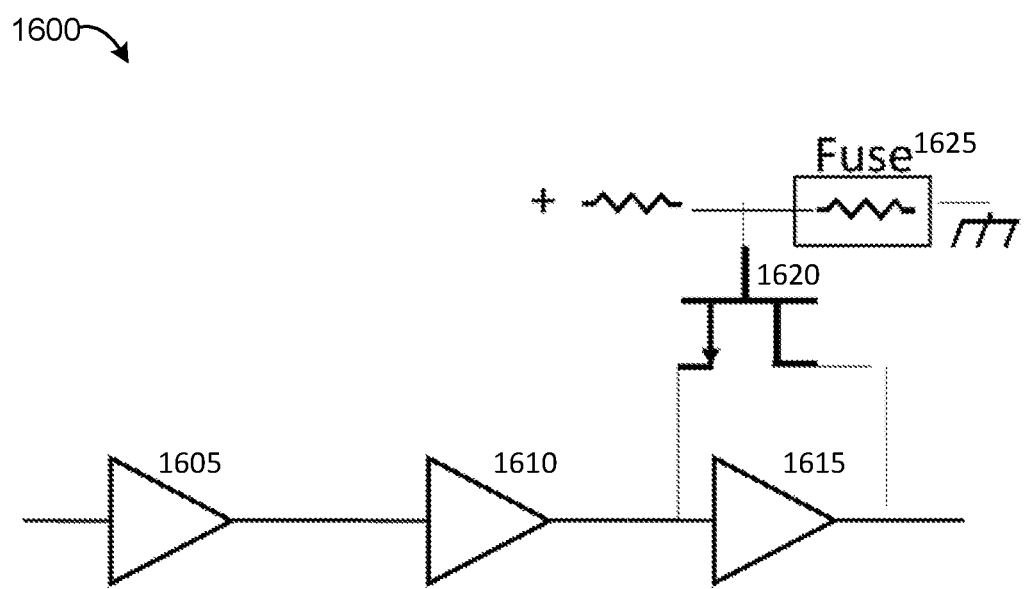
FIG. 16 depicts an example of a circuit with a fuse that controls, based on a trim bit value, whether a portion of the circuit operates or is bypassed.

FIG. 16 depicts a circuit of a three stage power amplifier 1600 with a fuse 1625 that controls, based on a trim bit value, whether a portion of the circuit operates or is bypassed. The power amplifier 1600 includes a first stage 1605, a second stage 1610, and a third stage 1615. Terminals of the switch 1620 are connected to the input and output terminals of the third stage 1615 of the power amplifier 1600, so that when the switch 1620 is closed, the third stage is bypassed. The switch opens or closes is in response to whether fuse 1625 is intact or blown. When fuse 1625 is intact, switch 1620 is off (open) and all three stages 1605, 1610, and 1615 are in operation. When fuse 1625 is blown switch, switch 1620 is closed and the third stage power amplifier is bypassed. Therefore, FIG. 16 is an example of a multi-use part, with a configuration determined by a trim bit. Other multi-use parts may be configured using one or more trim bits, with fuses controlled by trim bits to configure one or another configuration.

Figure 17:
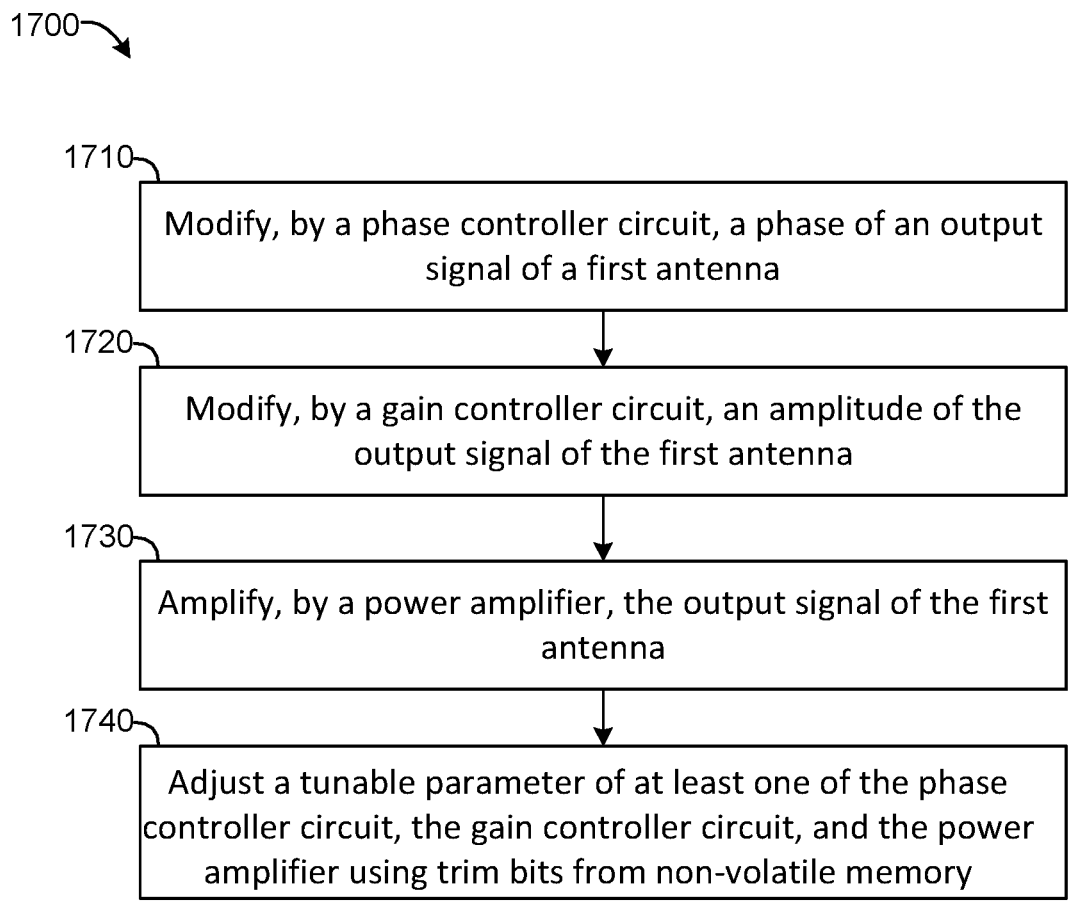
FIG. 17 depicts an example of a process of adjusting a tunable parameter of an antenna, in accordance with various implementations.

FIG. 17 depicts an example of a process 1700 of adjusting a tunable parameter of an antenna, in accordance with various implementations. In some aspects, the process 1700 may be performed by at least a portion of the integrated circuit 400 of FIG. 4.

In 1710, a phase controller circuit 312 may modify a phase of an output signal of a first antenna. For example, the phase controller circuit 312 may introduce a phase shift corresponding to the phase offset generated by at least adding phase calibration data obtained from non-volatile memory and phase command data obtained from static memory. The generated phase offset may be a combination of phase calibration data and phase command data. Phase calibration data may have been measured during testing to correct for variations in the circuit manufacturing process. As phase calibration data may not change over time, phase calibration data may be stored in non-volatile memory. Phase command data corresponds to a phase offset for an antenna to, for example, steer the output radiating from a transmitter. Phase command data may change as the radiated output is steered in a different direction. In the example of FIG. 4, the second digital adder 412 combines phase calibration and command data that are stored in the calibration register phase$_1$ and the command register phase$_1$, respectively.

In 1720, a gain controller circuit 314 may modify, based at least in part on a gain offset, an amplitude of the first output signal of the first antenna. The modified phase of the first output signal and the modified amplitude of the first output signal may be provided to enable pre-calibration of the first output signal. The gain offset may have been generated by the first digital adder 416 by at least adding gain calibration data obtained from non-volatile memory and gain command data obtained from static memory. The generated gain offset may be a combination of gain calibration data and gain command data. Gain calibration data may have been measured during testing to correct for variations in the circuit manufacturing process. As gain calibration data may not change over time, gain calibration data may be stored in non-volatile memory. Gain command data corresponds to a gain offset for an antenna to, for example steer the output radiating from a transmitter. Gain command data may change as the radiated output is steered in a different direction. In the example of FIG. 4, the first digital adder 416 combines gain calibration and command data that are stored in the calibration register gain$_1$ and the command register gain$_1$, respectively.

In 1730, a power amplifier 316 may amplify the output signal of the first antenna.

In 1740, a trim control circuit may adjust a tunable parameter of at least one of the phase controller circuit 312, the gain controller circuit 314, and the power amplifier 316 using trim bits from non-volatile memory.

In various aspects, process 1700 may further include receiving, by a digital control block 200, trim bits via a serial parallel interface and storing the received trim bits in non-volatile memory 210 for subsequent transfer to the trim control circuit 100A.

In various aspects, the power amplifier 316 includes multiple stages. In some aspects, the tunable parameter may be a bias of the final stage of the power amplifier 316. In some aspects, the power amplifier may have three stages. In some aspects, the trim control circuit 100A scales the bias of the last stage of the power amplifier by an integer between 0 and $2^n-1$ corresponding to a binary number formed by the trim bits, for which n corresponds to the number of trim bits. For some aspects, the trim control circuit 100A includes switches corresponding to the trim bits, each switch closed in response to the corresponding trim bit having a value of 1, each switch open in response to the corresponding trim bit having a value of 0.

In various aspects, the tunable parameter includes at least one of a bias, a gain, a power level, an error vector measurement, a phase, a resistance, a capacitance, and a frequency response.

In various aspects, the method 1700 further includes providing, by multiple antennas including the first antenna, multiple radio signals to a point in space where the radio signals constructively interfere with each other to form a directionally controlled beam. In various aspects, the method further includes transferring, by the digital control block 200, another set of trim bits to another trim control circuit 100B configured to adjust another tunable parameter of at least one of another phase controller circuit 322, another gain controller circuit 324, and another power amplifier 326. In various aspects, the other power amplifier 326 is configured to at least amplify another output signal of another one of the antennas.

In various aspects, the method 1700 further includes adjusting, by the other trim control circuit 100B, the other tunable parameter such that an error vector magnitude is minimized for an output power of the output signal from the antenna and another output power of the other output signal from the other antenna, wherein the output power equals the other output power.

In various aspects, the method 1700 further includes adjusting, by the other trim control circuit 100B, the other tunable parameter such that an output power is maximized for an error vector magnitude of the output signal of the antenna and another error vector magnitude of the other output signal of the other antenna, wherein the error vector magnitude equals the other error vector magnitude.

In various aspects, the method 1700 further includes adjusting, by the other trim control circuit 100B, the other tunable parameter such that an output power at 1-db compression of the output signal of the antenna equals another output power at 1-db compression of the other output signal.

In various aspects, the method 1700 further includes adjusting, by the trim control circuit 100A, a tunable parameter to a low gain configuration or a high gain configuration.

In various aspects, the method 1700 further includes comparing, by a skew detector, a skewed tunable parameter to an expected value for the skewed tunable parameter. In various aspects, the method further includes computing, by a processor 420, a third set of trim bits to adjust the skewed tunable parameter. In various aspects, the method 1700 further includes transferring, by the processor 420, the third set of trim bits to the digital control block. In various aspects, the digital control block 200 is configured to store the third set of trim bits in non-volatile memory.

In various aspects, the method 1700 further includes adjusting, by the trim control circuit 100A, a frequency band response for a beam formed by the plurality of antennas.

In some aspects, process 1700 may further include providing, via multiple antennas, multiple output radio signals to a point in space where the output radio signals constructively interfere with each other to form a direction-controlled beam. For example, multiple antennas 317, 327, 337, and 347 and active array element arms 310, 320, 330, and 340 (FIG. 3) may output radio signals that form a direction-controlled beam. In this example, antennas 327, 337, and 347 and active array element arms 320, 330, and 340 may have a similar structure and similar components as power amplifier 316, antenna 317, and active array element arm 310, as depicted in FIGS. 3 and 4.

In some aspects, at least the trim bits, the phase calibration data and the gain calibration data are programmed into the non-volatile memory through at least one of burning of fuses, one-time programming, and electrically erasable programmable read-only memory. For example, trim bits may be programmed into the non-volatile memory based at least in part on a measured difference between nominal or desired values of a tunable parameter in the integrated circuit. Further, the phase calibration data may be programmed into the non-volatile memory based at least in part on a measured difference in phase between a first digital signal that is provided to a first antenna 317, for example, and a second radio signal that is output by the first antenna 317, where the second radio signal is based on the first digital signal. Similarly, the gain calibration data may be programmed into the non-volatile memory based at least in part on a measured difference in amplitude between a first digital signal that is provided to a first antenna 317, for example, and a second radio signal that is output by the first antenna 317, where the second radio signal is based on the first digital signal. This first digital signal may be provided to the first antenna 317, for example, at design time, production time, manufacture time, and/or testing time, where an amplitude and/or phase of the second radio signal generated based on the first digital signal are measured. Based at least in part upon these measurements, phase and/or amplitude calibration data may be permanently stored in the digital control block 200, for example. These measurements may be taken at/near a point in space away from the integrated circuit 400 where the direction-controlled beam is intended to be formed (at least in part).

During operation, command data, such as the phase command data and/or the gain command data, may be determined, temporarily stored in a register, and/or provided to the integrated circuit 400, for example. This command data may be used to control operation of one or more antennas to form the direction-controlled beam. For example, the command data may be based on and/or used to control a desired characteristic of the direction-controlled beam, such as a direction and/or strength of the beam.

In some aspects, the process 1700 may include receiving, by one or more power splitting circuits 350, 355A, 355B, for example, a first digital signal from an input source 360, for example. In accordance with these aspects, the one or more power splitting circuits 350, 355A, 355B, for example, may provide a plurality of digital signals to an array of antennas, where the plurality of digital signals comprises the first output signal. As described herein, one or more of the plurality of digital signals may be modified based on properties of the respective antennas to which the digital signal is provided. In some aspect, one or more of the plurality of digital signals may be substantially the same in amplitude, phase, and/or the like before they are modified.

In various implementations, the process 1700 may include generating, by a third digital adder 419 (FIG. 4), for example, a vector offset by at least adding vector calibration data obtained from non-volatile memory and vector command data obtained from static memory. Process 1700 may also include modifying, by a vector correction circuit 700 (or a portion thereof), for example, a phase and/or an amplitude of a first output signal 790, for example, based at least in part on the vector offset. The modified phase of the first output signal and/or the modified amplitude of the first output signal may be provided to enable pre-calibration of the first output signal and/or a first antenna 317, for example. In some aspects, the vector calibration data includes a stored digital word, for example, which indicates an offset for one or both of the phase of the first output signal and the amplitude of the first output signal. In related embodiments, the vector command data is based on a desired characteristic of a direction-controlled beam (e.g., command data for the operation of an antenna).

As a non-limiting example of a benefit of the process 1700, time spent processing/calculating amplifier bias, amplitude gain and/or phase shift data for one or more of a plurality of antennas in an active antenna may be reduced, and/or efficiency of an active antenna may be improved.

As used herein, generating may refer to the actual generation of a radio-wave signal or may refer to the modification of a radio-wave signal which was originally generated by another circuit and/or device.

Although some specific examples are disclosed herein, they are merely examples as other types of circuits and component values may be used as well including sizing of components, differences in the logic circuits implementing the control, differences in the waveforms implementing the timing of the modulators, and/or the like.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

To provide for interaction with a user, one or more aspects or features of the subject matter described herein can be implemented on a computer which may access a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus comprising:
 a plurality of antennas configured to at least provide a plurality of radio signals to a point in space where the plurality of radio signals constructively interfere with each other to form a directionally controlled beam, the plurality of antennas comprising a first antenna and a second antenna;
 a power amplifier, configured to at least amplify an output signal of the first antenna, the power amplifier comprising a plurality of stages;
 a trim control circuit configured to adjust a bias of a current of one of the plurality of stages of the power amplifier using a first plurality of trim bits from a non-volatile memory, the trim control circuit further configured to scale the bias of the current of one of the plurality of stages of the power amplifier by an integer between 0 and $2^n-1$ corresponding to a binary number formed by the first plurality of trim bits, wherein n corresponds to the number of trim bits,
 the trim control circuit further configured to adjust another bias of another current of another power amplifier using a second plurality of trim bits from the non-volatile memory, the other power amplifier configured to at least amplify another output signal of the second antenna, wherein the bias is adjusted, and the other bias is adjusted, such that an error vector magnitude is minimized for an output power of the output signal from the first antenna and another output power of the other output signal from the second antenna, wherein the output power equals the other output power,
 the trim control circuit further configured to adjust a current of a phase controller circuit using a third plurality of trim bits from the non-volatile memory.

2. The apparatus of claim 1, further comprising a digital control block configured to store the first plurality of trim bits in the non-volatile memory, the digital control block further configured to transfer the stored first plurality of trim bits to the trim control circuit.

3. The apparatus of claim 1, wherein the trim control circuit comprises a plurality of switches corresponding to the first plurality of trim bits.

4. The apparatus of claim 1,
 wherein the phase controller circuit is configured to at least modify, based at least in part on a phase offset, a phase of the output signal of the first antenna, wherein the modified phase of the output signal is provided to enable a pre-calibration of the output signal.

5. The apparatus of claim 1, further comprising:
 a gain controller circuit configured to at least modify, based at least in part on a gain offset, an amplitude of the output signal of the first antenna, wherein the modified amplitude of the output signal is provided to enable a pre-calibration of the output signal, wherein the trim control circuit is further configured to adjust a tunable parameter of the gain controller circuit using a fourth plurality of trim bits from the non-volatile memory.

6. The apparatus of claim 1, wherein the trim control circuit is further configured to adjust the bias, and the trim control circuit is further configured to adjust the other bias such that an output power is maximized for an error vector magnitude of the output signal of the first antenna and another error vector magnitude of the other output signal of the second antenna, wherein the error vector magnitude equals the other error vector magnitude.

7. The apparatus of claim 1, wherein the trim control circuit is further configured to adjust the bias, and the trim control circuit is further configured to adjust the other bias such that an output power at 1-db compression of the output signal of the first antenna equals another output power at 1-db compression of the other output signal.

8. The apparatus of claim 1, wherein the trim control circuit is configured to adjust a tunable parameter to a low gain configuration or a high gain configuration.

9. The apparatus of claim 2, further comprising:
 a skew detector configured to compare a skewed tunable parameter to an expected value for the skewed tunable parameter; and
 a processor configured to compute a fifth plurality of trim bits to adjust the skewed tunable parameter, the processor further configured to transfer the fifth plurality of trim bits to the digital control block, wherein the digital control block is configured to store the fifth plurality of trim bits in the non-volatile memory.

10. The apparatus of claim 1, wherein the trim control circuit is further configured to adjust a frequency band response for a beamformer by the plurality of antennas.

11. A method comprising:
 providing, by a plurality of antennas, a plurality of radio signals to a point in space where the plurality of radio signals constructively interfere with each other to form a directionally controlled beam, wherein the plurality of antennas include a first antenna and a second antenna;

amplifying, by a power amplifier, an output signal of the first antenna, the power amplifier comprising a plurality of stages;

adjusting, by a trim control circuit, a bias of a current of one of the plurality of stages of the power amplifier using a first plurality of trim bits from a non-volatile memory;

scaling, by the trim control circuit, the bias of the current of one of the plurality of stages of the power amplifier by an integer between 0 and $2^n-1$ corresponding to a binary number formed by the first plurality of trim bits, wherein n corresponds to the number of trim bits;

amplifying, by another power amplifier, another output signal of the second antenna, the other power amplifier comprising a plurality of stages;

adjusting, by the trim control circuit, another bias of another current of one of the plurality of stages of the other power amplifier using a second plurality of trim bits from the non-volatile memory, wherein the bias is adjusted, and the other bias is adjusted, such that an error vector magnitude is minimized for an output power of the output signal from the first antenna and another output power of the other output signal from the second antenna, wherein the output power equals the other output power; and adjusting, by the trim control circuit, a current of a phase controller circuit using a third plurality of trim bits from the non-volatile memory.

12. The method of claim 11, further comprising:
storing, by a digital control block, the first plurality of trim bits in the non-volatile memory; and
transferring, by the digital control block, the stored first plurality of trim bits to the trim control circuit.

13. The method of claim 11, wherein the trim control circuit comprises a plurality of switches corresponding to the first plurality of trim bits.

14. The method of claim 11, further comprising:
modifying, by the phase controller circuit, based at least in part on a phase offset, a phase of the output signal of the first antenna, wherein the modified phase of the output signal is provided to enable a pre-calibration of the output signal.

15. The method of claim 11, further comprising:
modifying, by the gain controller circuit, based at least in part on a gain offset, an amplitude of the output signal of the first antenna, wherein the modified amplitude of the output signal is provided to enable a pre-calibration of the output signal; and
adjusting, by the trim control circuit, a tunable parameter of the gain controller circuit using a fourth plurality of trim bits from the non-volatile memory.

16. The method of claim 11, further comprising adjusting, by the trim control circuit, the other bias such that an output power is maximized for an error vector magnitude of the output signal of the first antenna and another error vector magnitude of the other output signal of the second antenna, wherein the error vector magnitude equals the other error vector magnitude.

17. The method of claim 11, further comprising adjusting, by the trim control circuit, the other bias such that an output power at 1-db compression of the output signal of the first antenna equals another output power at 1-db compression of the other output signal.

18. The method of claim 11, further comprising adjusting, by the trim control circuit, a tunable parameter to a low gain configuration or a high gain configuration.

19. The method of claim 12, further comprising:
comparing, by a skew detector, a skewed tunable parameter to an expected value for the skewed tunable parameter;
computing, by a processor, a fifth plurality of trim bits to adjust the skewed tunable parameter; and
transferring the fifth plurality of trim bits to the digital control block, wherein the digital control block is configured to store the fifth plurality of trim bits in the non-volatile memory.

20. The method of claim 11, further comprising adjusting, by the trim control circuit, a frequency band response for a beamformer by the plurality of antennas.

21. An apparatus, comprising:
means for providing, by a plurality of antennas, a plurality of radio signals to a point in space where the plurality of radio signals constructively interfere with each other to form a directionally controlled beam, the plurality of antennas including a first antenna and a second antenna;
means for amplifying an output signal of the first antenna, the means for amplifying comprising a plurality of stages;
means for adjusting a bias of a current of one of the plurality of stages of the means for amplifying using a first plurality of trim bits from a non-volatile memory;
means for scaling, by the means for adjusting the bias, the bias of the current of one of the plurality of stages of the means for amplifying the output signal, by an integer between 0 and $2^n-1$ corresponding to a binary number formed by the first plurality of trim bits, wherein n corresponds to the number of trim bits;
another means for amplifying another output signal of the second antenna, the other means for amplifying comprising a plurality of stages;
means for adjusting another bias of another current of one of the plurality of stages of the other means for amplifying using a second plurality of trim bits from the non-volatile memory, wherein the bias is adjusted, and the other bias is adjusted, such that an error vector magnitude is minimized for an output power of the output signal from the first antenna and another output power of the other output signal from the second antenna, wherein the output power equals the other output power; and
means for adjusting a current of a means for controlling a phase using a third plurality of trim bits from the non-volatile memory.

22. A non-transitory computer-readable medium storing instructions, which when executed by at least one data processor, result in operations comprising:
providing, by a plurality of antennas, a plurality of radio signals to a point in space where the plurality of radio signals constructively interfere with each other to form a directionally controlled beam, the plurality of antennas including a first antenna and a second antenna;
amplifying, by a power amplifier, an output signal of the first antenna, the power amplifier comprising a plurality of stages;
adjusting, by a trim control circuit, a bias of a current of one of the plurality of stages of the power amplifier using a first plurality of trim bits from a non-volatile memory;

scaling, by the trim control circuit, the bias of the current of one of the plurality of stages of the power amplifier by an integer between 0 and $2^n-1$ corresponding to a binary number formed by the first plurality of trim bits, wherein n corresponds to the number of trim bits;

amplifying, by another power amplifier, another output signal of the second antenna, the other power amplifier comprising a plurality of stages;

adjusting, by the trim control circuit, another bias of another current of one of the plurality of stages of the other power amplifier using a second plurality of trim bits from the non-volatile memory, wherein the bias is adjusted, and the other bias is adjusted, such that an error vector magnitude is minimized for an output power of the output signal from the first antenna and another output power of the other output signal from the second antenna, wherein the output power equals the other output power; and adjusting, by the trim control circuit, a current of a phase controller circuit using a third plurality of trim bits from the non-volatile memory.

* * * * *